United States Patent [19]

Ishikawa et al.

[11] Patent Number: 5,625,730
[45] Date of Patent: Apr. 29, 1997

[54] OPTICAL WAVEGUIDE MODULE HAVING WAVEGUIDE SUBSTRATE MADE OF PREDETERMINED MATERIAL AND FERRULE MADE OF MATERIAL DIFFERENT FROM THAT OF WAVEGUIDE SUBSTRATE

[75] Inventors: Shinji Ishikawa; Masahide Saito; Shigeru Semura, all of Yokohama, Japan

[73] Assignee: Sumitomo Electric Industries, Ltd., Osaka, Japan

[21] Appl. No.: 505,674

[22] Filed: Jul. 21, 1995

[30] Foreign Application Priority Data

Jul. 21, 1994 [JP] Japan .................................. 6-169496

[51] Int. Cl.⁶ .................................................. G02B 6/30
[52] U.S. Cl. .............................. 385/49; 385/51; 385/50; 385/98
[58] Field of Search .......................... 385/49, 50, 27, 385/28, 46, 80, 95–99, 51, 14; 525/433; 523/435, 436

[56] References Cited

U.S. PATENT DOCUMENTS

| | | | |
|---|---|---|---|
| 4,744,619 | 5/1988 | Cameron | 350/96.17 |
| 4,902,732 | 2/1990 | Itoh et al. | 525/433 |
| 5,185,835 | 2/1993 | Vial et al. | 385/49 |
| 5,199,093 | 3/1993 | Longhurst | 385/49 X |

FOREIGN PATENT DOCUMENTS 2-125208   5/1990   Japan.

94/23321   10/1994   WIPO.

OTHER PUBLICATIONS

Yamada et al, "Low–Loss and Stable Fiber–to–Waveguide Connection Utilizing UV Curable Adhesive", IEEE Photonics Technology Letters, vol. 4, No. 8, Aug. 1992, pp. 906–908.

Primary Examiner—Phan T. H. Palmer
Attorney, Agent, or Firm—Cushman Darby & Cushman, IP Group of Pillsbury Madison & Sutro, LLP

[57] ABSTRACT

This invention relates to an optical waveguide module having stable temperature characteristics and moist heat characteristics even in a severe environment. This optical waveguide module includes a waveguide component having an optical waveguide on a waveguide substrate made of silicon or silica glass as the first material, and a ferrule made of a plastic material as the second material. An end face of an optical fiber is fixed by adhesion while it is inserted in a through hole of the ferrule, the through hole having a continuous inner wall. This ferrule is fixed with an adhesive having a predetermined strength so that its the end face opposes the end face of the waveguide component. The second material satisfies a relationship:

$$|\Delta L/(E_1/E_2)| < 3.0 \times 10^{-6} (°C.^{-1})$$

with respect to the first material forming the waveguide substrate, where $\Delta L$ is a difference in thermal expansion coefficient between the first material and the second material, $E_1$ is a modulus of elasticity of the first material, and $E_2$ is a modulus of elasticity of the second material.

27 Claims, 13 Drawing Sheets

CONTENT OF SILICA FILLER (wt%)

CONTENT OF SILICA FILLER (wt%)

OPTICAL WAVEGUIDE MODULE HAVING WAVEGUIDE SUBSTRATE MADE OF PREDETERMINED MATERIAL AND FERRULE MADE OF MATERIAL DIFFERENT FROM THAT OF WAVEGUIDE SUBSTRATE

BACKGROUND OF THE INVENTION

1. Field of the Invention

The present invention relates to an optical waveguide module comprising at least a ferrule for holding one end of an optical fiber and a waveguide component having an optical waveguide on a substrate made of a material different from that of the ferrule and serving as an optical component. More particularly, the present invention relates to a ferrule capable of obtaining good temperature characteristics and good moist heat characteristics in terms of its relationship with the material of the substrate, an optical waveguide module utilizing this ferrule and an optical component, and a method of manufacturing this optical waveguide module.

2. Description of the Related Art

Along with recent developments in the optical communication techniques, demands have arisen for branching or multiplexing/demultiplexing elements which branch or multiplex light having a predetermined wavelength. Silica glass-based planar optical waveguide circuits (waveguide components) are used to satisfy demands for a higher packing density of these optical components. A planar optical waveguide has a low waveguide loss (a transmission loss accompanying optical branching and the like) and enables low-loss connection with an optical fiber.

As the planar optical waveguide, for example, Japanese Patent Laid-Open No. 58-105111 discloses a buried type silica-based waveguide component obtained by a scheme of forming a glass film in accordance with, e.g., flame hydrolysis (FHD), thereafter forming a circuit pattern in accordance with reactive ion etching (RIE) which is an application of a semiconductor technique, and forming a film of a cladding portion.

When such a waveguide component is to be utilized in an optical component (e.g., an optical waveguide module), input/output optical fibers are generally connected to an optical waveguide formed in this waveguide component. In connecting the waveguide component and the optical fibers, generally, a silica-based ferrule, which is precision-machined and in which optical fibers are fixed is used, as indicated in, e.g., IEEE Photonic Technology Letters, vol. 4, No. 8, (1992), pp. 906–908. The end face of the silica-based ferrule is fixed by adhesion to the end face of the waveguide component by using an ultraviolet-curing adhesive.

For example, Japanese Patent Laid-Open No. 6-51155 discloses a technique for forming a ferrule with silica glass which transmits ultraviolet rays therethrough and solidifying an adhesive between the end faces of the ferrule and waveguide component with each other uniformly within a short period of time, thereby shortening the work time and decreasing the possibility of misalignment between the end faces of the ferrule and waveguide component.

SUMMARY OF THE INVENTION

In optically connecting one or more optical fibers and one or more optical waveguides formed in a waveguide component with each other, it is most important to decrease a transmission loss which is caused by the positional displacement of this connecting portion (the positional displacement between the end faces of the cores of the optical fibers and the end faces of the optical waveguides opposing the end faces of the cores through an adhesive) (a transmission loss at this connecting portion will be referred to as a coupling loss hereinafter). For example, an optical waveguide formed in the waveguide component has a diameter (core diameter) of 10 µm or less. In order to suppress the coupling loss between this optical waveguide and an optical fiber (the core of the optical fiber) to less than 0.3 dB, the positional shift amount at the connecting portion must be suppressed within 1 µm. On the other hand, in an optical waveguide module in which a waveguide component (especially a waveguide substrate) and a ferrule which are made of materials having different thermal expansion coefficients are fixed by adhesion with an adhesive having a predetermined strength, when the temperature of the environment varies, the end faces of the cores of the optical waveguide and of the optical fibers are misaligned from each other.

Hence, in order to obtain an optical waveguide module that can be used in a severe environment (for example, with the temperature characteristic specifications of a component used indoors, 10 cycles (48 hours) with temperature variations from −10° C. to 60° C.; with the temperature characteristic specifications of TR-NWT-001209 manufactured by Bellcore, 42 cycles (336 hours) with temperature variations from −40° C. to 75° C.), a ferrule for holding the end portions of optical fibers is generally made of silica glass having a thermal expansion coefficient almost equal to that of the material of the waveguide substrate, as described above, so that desired temperature characteristics and moist heat characteristics can be obtained. FIG. 29 is a graph showing the relationship, in a single-mode optical waveguide having a mode field diameter of 10 µm, between the positional shift amount between the end faces of the optical waveguides and the end faces of the cores of the optical fibers and the transmission loss of the optical waveguide.

However, in consideration of only the manufacturing technique of the ferrule, when an optical waveguide module is to be manufactured with silica glass as described above, a material, e.g., glass, which is difficult to machine must be machined at high precision within 1 µm, as disclosed in the above official gazettes (machining of grooves for fixing the positions of optical fibers). Furthermore, the ferrule must be constituted by a plurality of constituent members (the end portions of the optical fibers must be sandwiched by upper and lower silica glass plates) to clamp the end portions of the optical fibers. When a ferrule is to be formed of a plastic material, it can be molded with a single step by plastic molding, and through holes (having continuous inner walls) that define the positions of the optical fibers upon insertion of the end portions of the optical fibers can also be formed at high precision during this plastic molding, as described in, e.g., "*DEVELOPMENT OF 16-FIBER CONNECTORS FOR HIGH-SPEED LOW-LOSS CABLE CONNECTION*" (INTERNATIONAL WIRE AND CABLE SYMPOSIUM PROCEEDINGS 1993, pp. 244–249). When the ferrule is formed of the plastic material, in this manner, the end portions of the optical fibers need not be clamped by preparing a plurality of members for the purpose of obtaining the clamping structure of the end portions of the optical fibers (since through holes that define the positions of the end portions of the optical fibers can be formed simultaneously during plastic molding, the positioned distal ends of the optical fibers need not be vertically sandwiched and clamped). Also, no high-precision machining technique is required (since the through holes are formed in units of the optical fibers at high precision, precision machining, e.g., formation of grooves for fixing the positions of optical fibers in the clamping members, is not needed). Therefore, this plastic material is suitable as the material of the ferrule.

The present invention has been made in view of the above situations, and has as its object to provide an optical waveguide module which utilizes a ferrule made of a low-cost plastic material that can be continuously molded and high-precision machined easily, in place of a material, e.g., glass, which is difficult to machine. The module comprises a waveguide component (in particular, a waveguide substrate) and a ferrule made of materials having different thermal expansion coefficients, and which has stable temperature characteristics and moist heat characteristics even in a severe environment. A method of manufacturing the module also is provided.

An optical waveguide module of the present invention comprises a waveguide component obtained by forming an optical waveguide constituting at least part of a transmission line for propagating light having a predetermined wavelength on a waveguide substrate made of the first material (e.g., silicon or silica glass is suitable as the first material), and a ferrule made of the second material (e.g., a plastic material is suitable as the second material). The ferrule fixed with an adhesive having a predetermined strength such that an end face thereof opposes the end face of the waveguide component while holding one end of an optical fiber (the end portion of the optical fiber is placed as it is inserted in a through hole having a continuous inner wall), so as to optically couple the optical fiber constituting at least part of the transmission line and the optical waveguide of the waveguide component. This optical waveguide module further comprises an input/output optical fiber fixed by adhesion in the ferrule such that its end portion is inserted in the through hole of the ferrule. With this arrangement, branching or multiplexing of signal light from an existing transmission line or to the transmission line is easily realized. The optical fiber is constituted by a core for propagating light having a predetermined wavelength, and a cladding layer covering the core. Normally, the optical fiber is utilized while the surface of the cladding layer is covered with a polyacrylate-based resin. The surface of the resin coating may be further covered with a plastic. The optical fiber is not limited to a single-fiber fiber but can includes a ribbon fiber (for example, a 8-fiber ribbon fiber as shown in FIGS. 7 and 8) obtained by integrally covering a plurality of optical fibers (each optical fiber may be coated with a polyacrylate-based resin colored in different colors) with a plastic material.

In particular, in order to realize an optical waveguide module whose coupling loss is 0.3 dB or less even under severe temperature variations (e.g., temperature variations within a range of −40° to +75° C.), the first material to form the substrate portion of the waveguide component and the second material to form the ferrule satisfy a relation:

$$|\Delta L/(E_1/E_2)| < 3.0 \times 10^{-6} (°C.^{-1}) \quad (1)$$

where $\Delta L$ is a difference in thermal expansion coefficient between the first material and the second material, $E_1$ is the modulus of elasticity of the first material, and $E_2$ is the modulus of elasticity of the second material.

When the plastic material to form the ferrule is a phenol-based epoxy resin containing a predetermined amount of silica filler, it suffices if its thermal expansion coefficient is $10 \times 10^{-6} (°C.^{-1})$ or less. In order to obtain further superior temperature characteristics, this thermal expansion coefficient is preferably $6 \times 10^{-6} (°C.^{-1})$ or less.

It suffices if the content of the silica filler contained in this phenol-based epoxy resin is 85 weight or more and 95 weight % or less. In order to obtain further superior moist heat characteristics, this content is preferably 90 weight % or more and 95 weight or less. At this time, the modulus of elasticity of the above phenol-based epoxy resin is 5,000 (kg/mm$^2$) or less.

As the adhesive used for fixing the end face of the optical waveguide and the end face of the optical fiber with each other by adhesion, an ultraviolet-curing adhesive or thermosetting adhesive having an adhesion strength of 50 (kg/cm$^2$) or more with respect to silica glass is employed. Furthermore, an adhesive having both ultraviolet-curing and thermosetting properties can be used.

In a method of manufacturing the above optical waveguide module of the present invention, a waveguide component in which an optical waveguide constituting at least part of a transmission line for propagating light having a predetermined wavelength is formed on a waveguide substrate made of the first material. A ferrule made of the second material and fixed with an adhesive to the end portion of an optical fiber (including input/output optical fibers) constituting at least part of the transmission line, while the end portion of the optical fiber is inserted in a through hole having a continuous inner wall, is also prepared. At this time, the effective thermal expansion coefficient $|\Delta L/(E_1/E_2)|$ of the second material (e.g., a plastic material is suitable) forming the ferrule with respect to the first material (e.g., silicon or silica glass is suitable) to form the waveguide substrate of the waveguide component is $3.0 \times 10^{-6} (°C.^{-1})$ or less.

The end face of the waveguide component and the end face of the ferrule are abutted with each other and are adhered to each other with an adhesive, e.g., an ultraviolet-curing or thermosetting adhesive having an adhesion strength of 50 (kg/cm$^2$) or more with respect to silica glass. Thus, the end face of the optical waveguide of this waveguide component and the end face of the core of the optical fiber, the position of the end portion of which is defined by the through hole of the ferrule, are aligned with each other. Thereafter, ultraviolet rays are irradiated on this adhering portion for a predetermined period of time, and/or this adhering portion is heated to a predetermined temperature, thereby solidifying the adhesive.

As described above, the ferrule according to the present invention is made of a phenol-based epoxy resin containing a predetermined amount of silica filler and having a thermal expansion coefficient of $10 \times 10^{-6} (°C.^{-1})$ or less, preferably $6 \times 10^{-6} (°C.^{-1})$ or less. The content of the silica filler is 85 weight % or more and 95 weight % or less, and preferably 90 weight % or more and 95 weight % or less. The plastic material which forms this ferrule is preferably a phenol-based epoxy resin having a modulus of elasticity of 5,000 (kg/mm$^2$) or less.

When this optical waveguide module is constituted by utilizing the respective constituent members made of different materials, e.g., a waveguide substrate made of silicon or silica glass and a ferrule made of a plastic material, if the effective thermal expansion coefficient of the material forming the ferrule with respect to the material forming the waveguide substrate is set to $3 \times 10^{-6} (°C.^{-1})$ or less, as indicated by the above equation (1), the shift amount between the end faces of the cores which is caused by temperature variations can be suppressed to 1 μm or less, that is, the coupling loss can be suppressed to 0.3 dB or less. At least, the present inventors confirmed that, in order to obtain a ferrule that can be applied to a silica glass substrate constituting part of the waveguide component (in order to satisfy the above conditions), the ferrule had to be made of a plastic material (having a thermal expansion coefficient of $3 \times 10^{-6}$ °C.$^{-1}$ or more and $10 \times 10^{-6}$ °C.$^{-1}$ or less) containing at least 75 weight % of a silica filler, and that in order to obtain a ferrule that can be applied to a silicon substrate, the ferrule must be made of a plastic material (having a thermal expansion coefficient of $3 \times 10^{-6}$ °C.$^{-1}$ or more and $10 \times 10^{-6}$ °C.$^{-1}$ or less) containing at least 85 weight % of a silica filler. It was also confirmed that the optical waveguide module having the above arrangement could obtain good temperature characteristics.

On the other hand, "Kogyo Zairyo" December issue, 1994 (Vol. 42, No. 15, pp. 112–116) shows that the theoretical limit value of a silica filler that can be contained in a plastic material is 96 volume %. The present inventors have already obtained a plastic ferrule containing 94 weight % of a silica filler. Furthermore, the present inventors performed evaluation of the moist heat characteristics of an optical waveguide module constituted by a silica glass waveguide substrate and a plastic ferrule under predetermined conditions, and confirmed that the lower limit of the silica filler contained in the plastic material was between 80 weight % and 90 weight %. Since the theoretical limit value of the content of the silica filler is 96 volume %, the lower limit of the thermal expansion coefficient of the plastic material as the material which forms the ferrule is $3 \times 10^{-6}$ (°C.$^{-1}$) (see FIG. 19). The 96 volume % as the silica filler content can be roughly regarded as the 96 weight % as the silica filler content.

Therefore, when either a silicon substrate or a silica glass substrate is utilized, if a plastic material containing at least 85 weight % to 95 weight % of a silica filler is employed as the material which forms the ferrule, an optical waveguide module having both good temperature characteristics and good moist heat characteristics can be obtained.

In particular, when the material to form the ferrule on a silica glass substrate is determined to be a phenol-based epoxy resin containing a predetermined amount of silica filler and having a thermal expansion coefficient of $10 \times 10^{-6}$ (°C.$^{-1}$) or less and the material which forms the ferrule on a silicon substrate is defined to be a phenol-based epoxy resin containing a predetermined amount of silica filler and having a thermal expansion coefficient of $6 \times 10^{-6}$ (°C.$^{-1}$) or less, an optical waveguide module can be obtained which satisfies the temperature characteristic specifications of a component used indoors described above (10 cycles (48 hours) with temperature variations from $-10°$ C. to $60°$ C.), and the temperature characteristic specifications of TR-NWT-001209 manufactured by Bellcore (42 cycles (336 hours) with temperature variations from $-40°$ C. to $75°$ C.).

When the content of the silica filler is adjusted to 90 weight % or more and 95 weight % or less, an optical waveguide module which reliably satisfies the moist heat characteristics ($60°$ C., 95 RH, 336 hours) of TR-NWT-001209 manufactured by Bellcore can be obtained.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
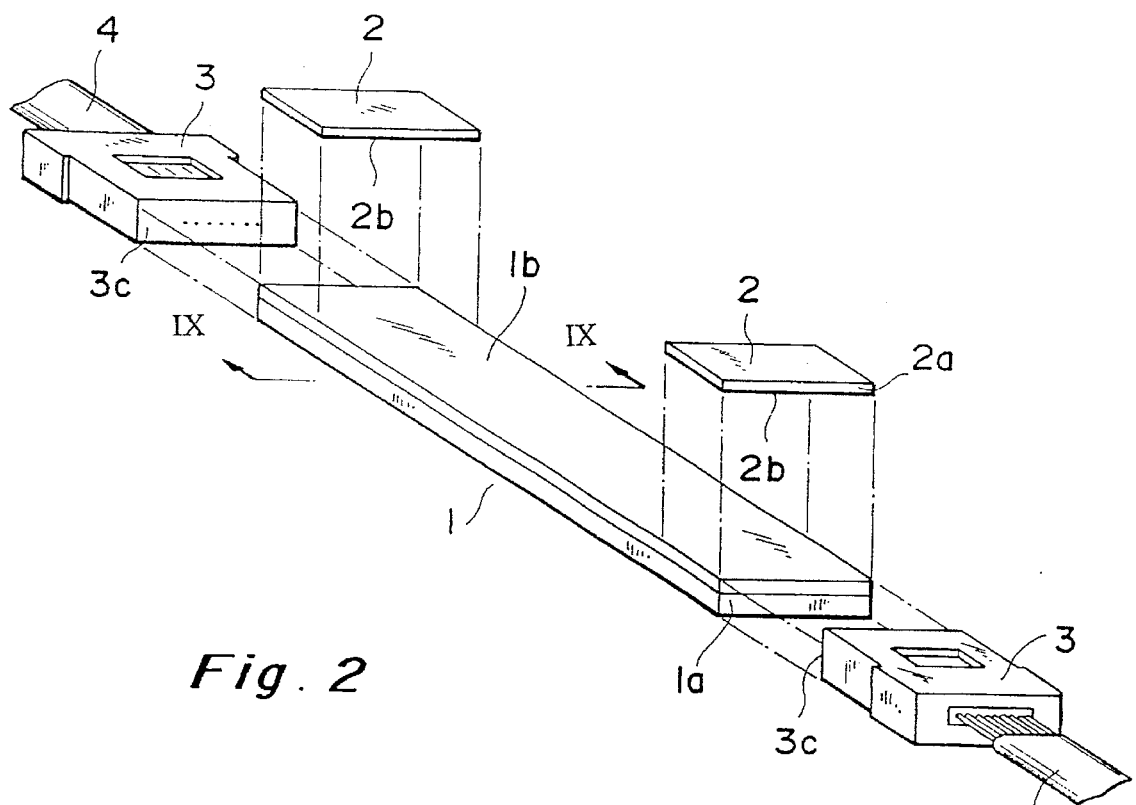
FIG. 1 is a view for explaining the assembling process of an optical waveguide module according to the first embodiment of the present invention.

The preferred embodiments of the present invention will be described with reference to FIGS. 1 to 29. Note that the same portions are denoted by the same reference numerals throughout the drawings, and repeated detailed descriptions of the same portions will be omitted.

Figure 2:
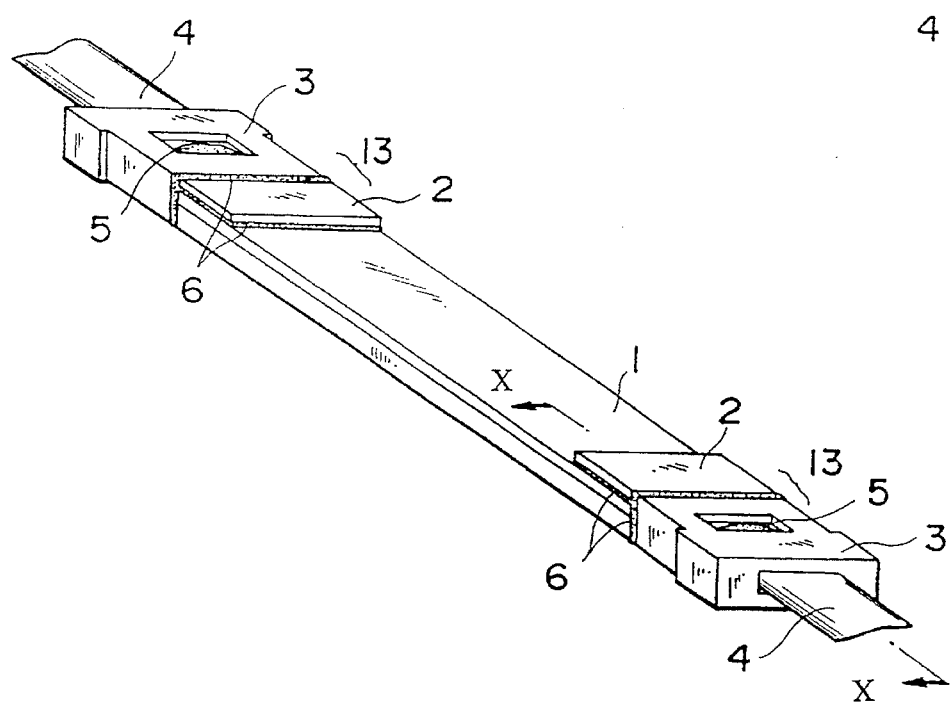
FIG. 2 is a perspective view showing the structure of the optical waveguide module according to the first embodiment of the present invention.

FIG. 1 is a view for explaining the assembling process of an optical waveguide module according to the present invention, and FIG. 2 is a perspective view showing the entire arrangement of the optical waveguide module according to the present invention. In a method of manufacturing the optical waveguide module according to the present invention, first, a ferrule 3, to which the end portion of an input/output ribbon fiber 4 is fixed by adhesion with an adhesive 5 as exposed optical fibers of the ribbon fiber 4 are inserted in through holes, and a waveguide component 1 having, on a waveguide substrate, optical waveguides (cores) for propagating light having a predetermined wavelength are prepared. A reinforcing member 2 is prepared to obtain a sufficiently high adhesion strength between the ferrule 3 and the waveguide component 1. The reinforcing member 2 has a bottom surface 2b fixed by adhesion on an upper surface 1b of the waveguide component 1 with an adhesive and a side surface 2a opposing an adhering end face 3c of the ferrule 3. An adhering end face 1a of the waveguide component having the upper surface 1b to which the reinforcing member 2 has already been fixed by adhesion and the adhering end face 3c of the ferrule 3 that holds the end portions of the expose optical fibers of the ribbon fiber 4 are optically polished by sequentially performing the following steps. The adhering surface (side surface) 2a of the reinforcing member 2 is polished simultaneously during polishing of the end face of the waveguide component 1, and the end faces of the cores of the optical fibers fixed by the ferrule 3 are also polished simultaneously during polishing of the end face of the ferrule 3.

First Step (Rough Polishing Step):
Each end face is exposed by polishing with coarse abrasive paper of #800 to #2,000.

Second Step (Intermediate Polishing Step):
Surface scars on each end face are removed with diamond abrasive grains of 6 to 9 μm.

Third Step (Finish Polishing Step):
The surface scars on each end face are further removed with diamond abrasive grains of 1 to 3 μm.

Fourth Step (Buff Polishing Step):
A layer on the surface of each end face which is denatured by processing is removed by cesium oxide grains or silicon dioxide grains of 0.3 μm or less.

In these polishing steps, the angle of each end face may be shifted with respect to the propagation direction (this direction coincides with the direction in which the ribbon fiber 4 is inserted into the ferrule 3) at an adhering or connecting portion 13 from 90° in order to decrease or similar affect the amount of optical attenuation which is caused by reflection of the end face. Angle adjustment required in this case is performed in the first step. Polishing methods other than the above polishing method is also known. Thus, a polishing method will be selected as required.

Subsequently, the input/output end face 1a of the waveguide component i and the adhering end face 3c of the ferrule 3 are abutted against each other and adhered to each other with an adhesive 6. The end faces of the optical waveguides formed in the waveguide component 1 and the end faces of the cores of the optical fibers of the ribbon fiber 4 are aligned. At this time, the optical fibers have already been fixed in the ferrule 3 with the adhesive 5 having a predetermined strength, while being inserted in through holes of the ferrule 3. The bottom surface 2b of the reinforcing member 2 and the upper surface 1b of the waveguide component 1; and the adhering surface 2a of the reinforcing member 2 and the adhering face 1a of the waveguide component 1 are adhered to each other with an ultraviolet-curing or thermosetting adhesive having an adhesion strength of 50 kg/cm² or more, and preferably 100 kg/cm² or more, with respect to silica glass. Furthermore, an adhesive having both ultraviolet-curing and thermosetting properties can be used if it has a sufficient adhesion strength such as 50 kg/cm² or more with respect to silica glass.

Alignment of the end faces of the optical waveguides of the waveguide component 1 and the end faces of the cores of the optical fibers 4 with each other, while the waveguide component 1 is supported by a movable precision stage is then performed. Light having a predetermined wavelength is caused to be incident on the optical waveguides of the waveguide component 1 through one input/output end face of the waveguide component 1, and the intensity of light emerging from the optical fibers optically connected to the other input/output end of the waveguide component 1 with the adhesive is monitored, as is described in, e.g., U.S. Pat. No. 4,744,619. More specifically, the waveguide component 1 is moved such that the optical intensity of the emerging light becomes the maximum, thereby performing alignment.

When alignment of the end faces (constituting part of the input/output end face of the waveguide component 1) of the optical waveguide of the waveguide component 1 and the end faces (constituting part of the adhering end face 3c of the ferrule 3) of the cores of the optical fibers is completed, the adhering portion 13 is irradiated with ultraviolet rays or is heated to a predetermined temperature, thereby solidifying the adhesive. This series of operations (adhesion of the respective end faces at the adhering portion 13—alignment —solidification of the adhesive) are performed for each of the two input/output end faces of the waveguide component 1, thereby obtaining an optical waveguide module as shown in FIG. 2 according to the first embodiment of the present invention.

Figure 3:
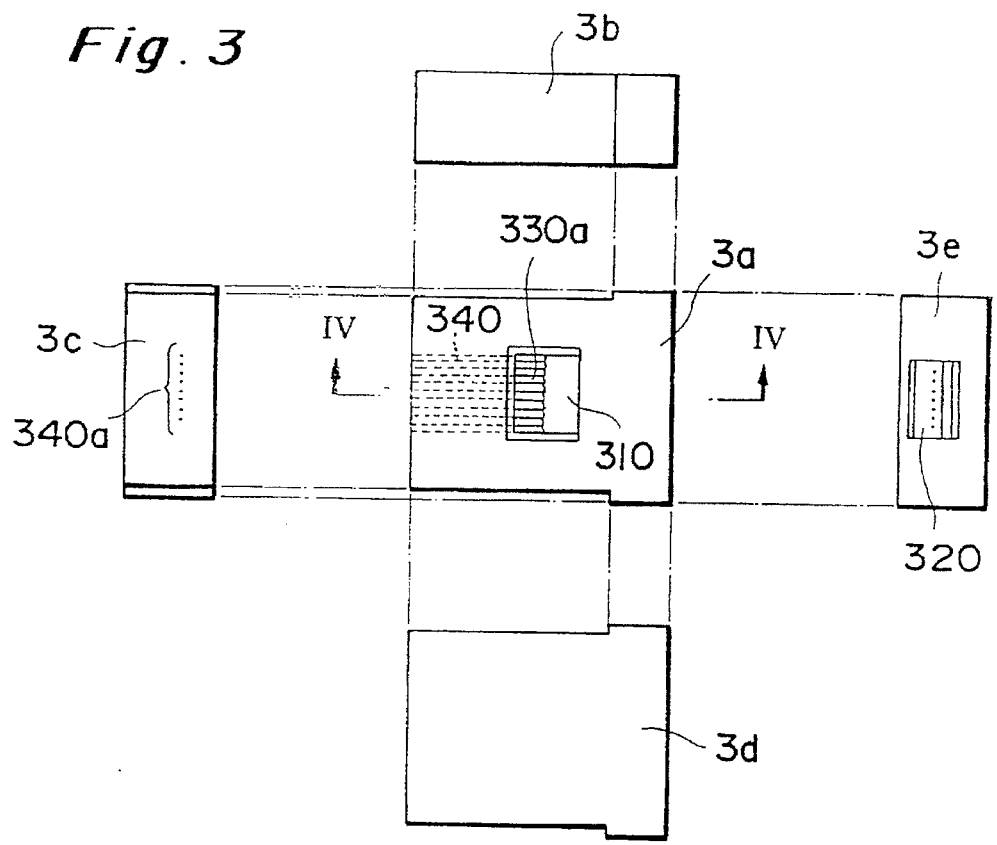
FIG. 3 is a developed view of a ferrule for explaining the structure of the ferrule.

The structure of the ferrule 3 will be described with reference to FIGS. 3 to 5. FIG. 3 is a developed view showing the structure of this ferrule 3. Referring to FIG. 3, reference symbol 3a denotes the upper surface of the ferrule 3; 3b, the side surface thereof; 3c, the front surface (adhering surface) thereof; 3d, the bottom surface thereof; and 3e, the rear surface (in which the distal end of the ribbon fibers 4 is inserted) thereof. A window 310 is formed in advance in the upper surface 3a of the ferrule 3 in order to observe insertion of the distal end (a plurality of optical fibers are exposed by removing a part of ribbon) of the ribbon fibers 4 into the ferrule 3. Guide grooves 330a are formed in advance in a base portion 330 of the ferrule 3 that can be seen through the window 310, in order to facilitate insertion of the distal ends of the exposed optical fibers in the through holes 340. Since the distal end of the ribbon fiber 4 and the ferrule 3 are fixed by adhesion at this base portion 330, the window 310 also serves as an introducing port of the adhesive. An opening portion 320 for allowing insertion of the distal end portion of the ribbon fiber 4 into the ferrule 3 is formed in the rear surface 3e of the ferrule 3. Opening portions 340a of the through holes 340 that are formed in advance are located on the end face 3c (a surface directly opposing the input/output end face 1a of the waveguide component 1) of the ferrule 3.

Figure 4:
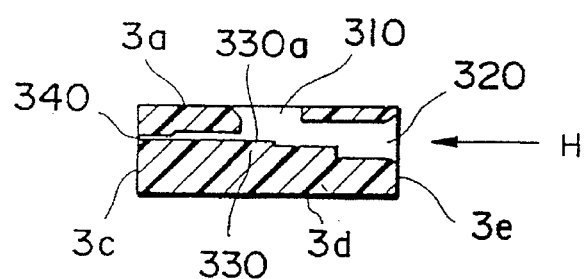
FIG. 4 is a view showing the sectional structure of the ferrule shown in FIG. 3 along the line IV—IV of FIG. 3.

FIG. 4 shows the section of the ferrule 3 shown in FIG. 3 taken along the line IV—IV. The distal end portions of the exposed optical fibers of the ribbon fiber 4 are inserted into the through holes 340 of the ferrule 3 in the direction of an arrow H through the rear surface 3e toward the front surface 3c. FIG. 5 particularly shows, of the section of the ferrule 3 shown in FIG. 4, the enlarged section of one through hole 340. As shown in FIG. 5, the interior of each through hole 340 is constituted by a portion 340b and a portion 340c. The portion 340b has a much larger diameter than that of each optical fiber to facilitate insertion of the distal end portion of the optical fiber. The portion 340c has a diameter substantially equal to the diameter of the optical fiber to prevent a positional shift (a positional shift in the horizontal direction with respect to the front surface 3c) of the distal end portion of the optical fiber.

As has been described previously, the first material (e.g., silicon or silica glass) suitable for forming the substrate of the waveguide component 1 and the second material (e.g., a plastic material) suitable for forming the ferrule 3 are different. Therefore, even if the waveguide component 1 and the ferrule 3 are fixed to each other by adhesion by accurately performing alignment, if the temperature varies in the range of, e.g., −40° C. to +75° C., a positional shift occurs between the end faces of the optical waveguides of the waveguide component 1 and the end faces of the cores of the optical fibers due to the difference in thermal expansion coefficient between the two materials (the coupling loss is increased).

Therefore, according to the present invention, in order to suppress the coupling loss to 0.3 dB or less even under the temperature variations described above, the ferrule 3 is formed of the second material whose effective thermal expansion coefficient $|\Delta L/(E_1/E_2)|$ with respect to the first material suitable for the waveguide substrate of the waveguide component 1 is less than $3 \times 10^{-6}$ °C.$^{-1}$ In the formula representing the effective thermal expansion coefficient, $\Delta L$ is a difference in thermal expansion coefficient between the first and second materials, $E_1$ is the modulus of elasticity of the first material, and $E_2$ is the modulus of elasticity of the second material.

In particular, the present inventors have obtained an optical waveguide module having excellent temperature characteristics by combining a waveguide substrate made of silicon or silica glass and a ferrule 3 made of a phenol-based epoxy resin (containing a predetermined amount of silica filler) having a thermal expansion coefficient of $10 \times 10^{-6}$ °C.$^{-1}$ or less, or furthermore by a phenol-based epoxy resin (containing a predetermined amount of silica filler) having a thermal expansion coefficient of $6 \times 10^{-1}$ °C.$^{-1}$ or less. When the ferrule 3 is formed of the phenol-based epoxy resin, the content of the silica filler is preferably 85 weight % to 95 weight %. The present inventors have also confirmed that the content of the silica filler is preferably 90 weight % to 95 weight % to obtain an optical waveguide module having further superior moist heat characteristics. The modulus of elasticity of these phenol-based epoxy resins is 5,000 kg/mm$^2$ or less.

The ferrule 3 made of the above material is obtained by plastic molding, as is indicated in, e.g., "*DEVELOPMENT OF 16-FIBER CONNECTORS FOR HIGH-SPEED LOW-LOSS CABLE CONNECTION*" (INTERNATIONAL WIRE AND CABLE SYMPOSIUM PROCEEDINGS 1993, pp. 244–249). More specifically, two, i.e., upper and lower dies each having a recess of a predetermined shape are prepared. Metal core pins for forming the through holes in the ferrule 3 are gripped by these dies, and the resin described above is injected into a cavity defined by the recesses of the respective dies, thereby obtaining the ferrule 3.

Figure 5:
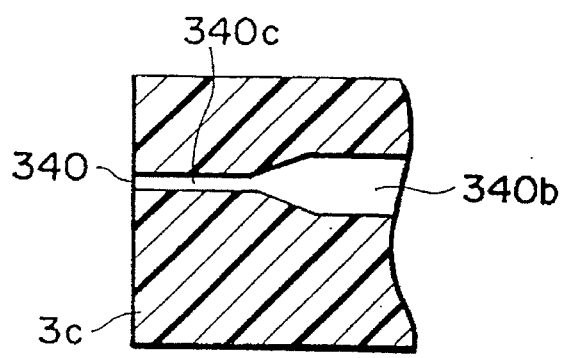
FIG. 5 is an enlarged view of the main part of the section of the ferrule shown in FIG. 4.
Figure 6:
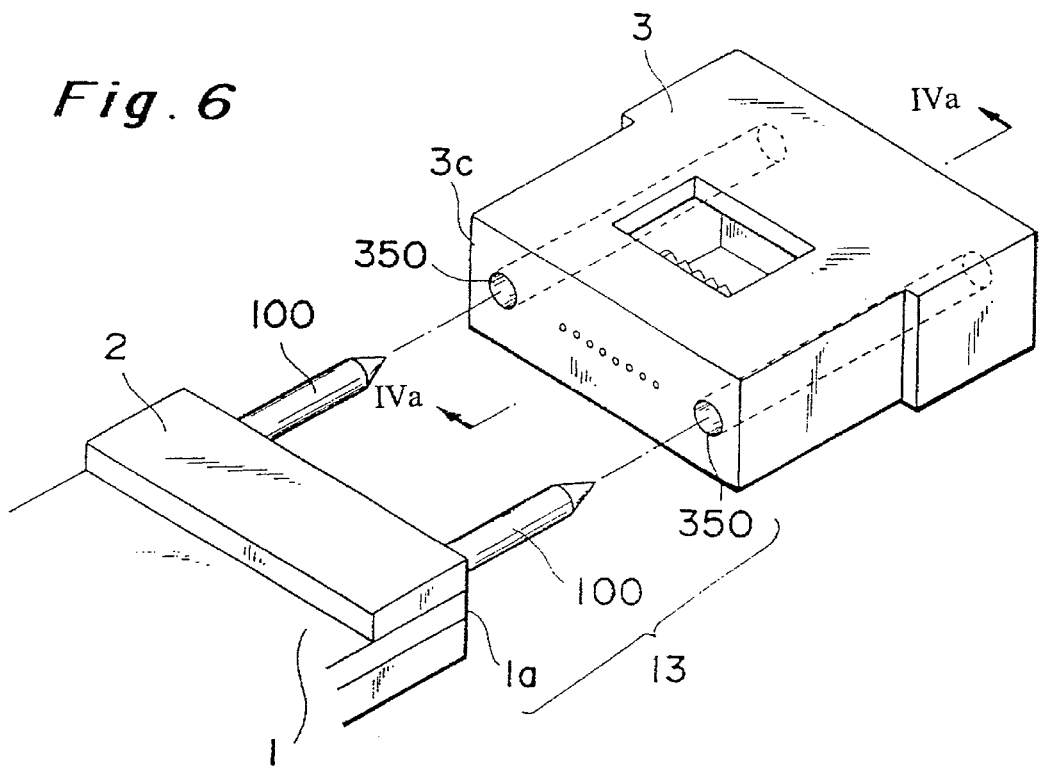
FIG. 6 is a view for explaining the aligning method of the optical waveguide module of the present invention.

When the optical waveguide module shown in FIG. 2 is fabricated with the above material by utilizing the ferrule 3 having the structure as shown in FIGS. 3 to 5 and the ultraviolet-curing adhesive, it is difficult to uniformly adhere the end faces of optical waveguides 130 and the end faces of the cores of the optical fibers 4 at the adhering portion 13 without causing a positional shift between these end faces, as is pointed out by Japanese Patent Laid-Open No. 6-51155 described above. However, if holes 350 for guide pins, as shown in FIG. 6, are formed in the ferrule 3 in advance, the above alignment operation can be omitted. Even if solidification of the adhesive requires a long period of time, the positional shift between the end faces of the optical waveguides of the waveguide component 1 and the end faces of the cores of the optical fibers held by the ferrule 3 can be avoided. A method of manufacturing a plastic ferrule having guide pin holes is disclosed in, e.g., "*HIGH FIBER COUNT OPTICAL CONNECTORS*" (INTERNATIONAL WIRE AND CABLE SYMPOSIUM PROCEEDINGS 1993, pp. 238–243). In this case, the two ends of each guide pin 100 are inserted in a hole formed in the waveguide component 1 (in particular, a waveguide substrate) and the hole 350 formed in the ferrule 3, respectively, and the adhering end face 1a of the waveguide component 1 and the adhering end face 3c of the ferrule 3 are adhered to each other with the above adhesive (an ultraviolet-curing or thermosetting resin having an adhesion strength of at least 50 kg/cm$^2$ with respect to silica glass), thereby making a separate alignment operation unnecessary. This alignment method utilizing guide pins is disclosed in, e.g., Japanese Patent Laid-Open Nos. 2-125208 and 5-333231. The section of the ferrule 3 shown in FIG. 6 along the line IVa—IVa of FIG. 6 coincides with the section of the ferrule shown in FIG. 4.

Figure 7:
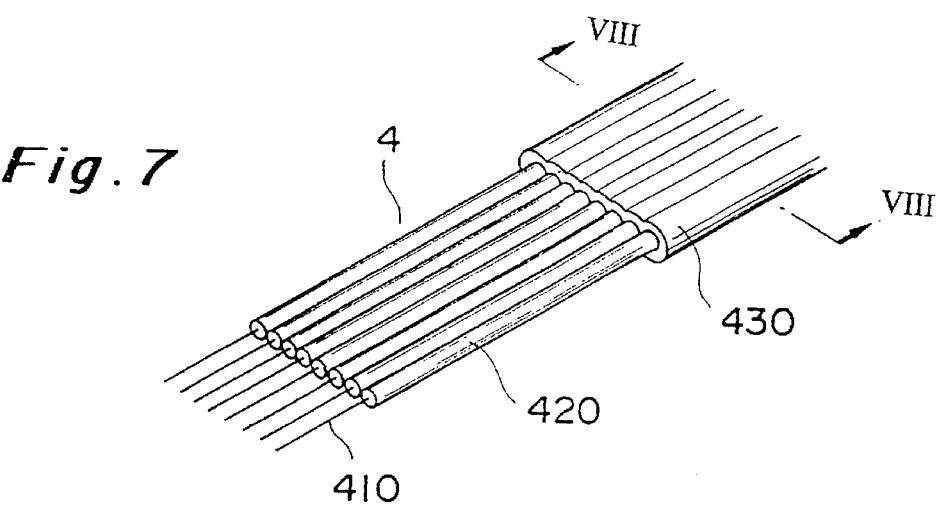
FIG. 7 is a perspective view for explaining the structure of the distal end portion of a ribbon fiber.
Figure 8:
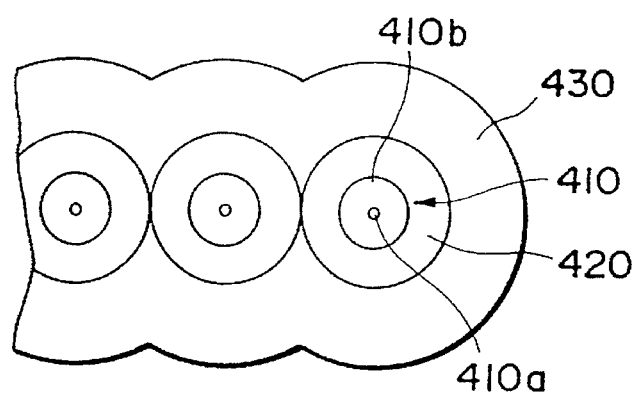
FIG. 8 is a view showing the sectional structure of the ribbon fiber shown in FIG. 7 taken along the line VIII—VIII of FIG. 7.

Each optical fiber which is held by the ferrule 3 by its end portion being inserted in the corresponding through hole 340 of the ferrule 3 is generally constituted by a core for propagating light having a predetermined wavelength and a cladding covering the core and having a lower refractive index than that of the core. In this embodiment, a ribbon fiber 4 as shown in FIGS. 7 and 8, obtained by coating a plurality of optical fibers with a plastic coating, is utilized. In this case, each bare fiber 410 (constituted by a core 410a and a cladding 410b) is individually coated with a polyarcylate-based resin 420, and a ribbon portion 430 in which the fibers 410 coated with the polyacrylate-based resin in this manner are assembled in an array is coated with a plastic. To fix the optical fibers in the ferrule 3 by adhesion, the plastic coatings 430 at the distal end portion of the ribbon fiber 4 is removed (the resin coatings 420 are also removed). The ribbon fiber 4 is mounted in the through holes 340, formed in units of the optical fibers, through the opening portion 320 formed in the rear surface 3e of the ferrule 3, and are fixed at the base portion 330 of the ferrule 3 with the adhesive 5. Optical fibers constituting other transmission lines may be directly mounted in the ferrule 3, or other input/output optical fibers may be mounted in advance to allow connection with other transmission lines. In either case, the optical fibers mounted in the ferrule 3 constitute part of the transmission line.

Figure 9:
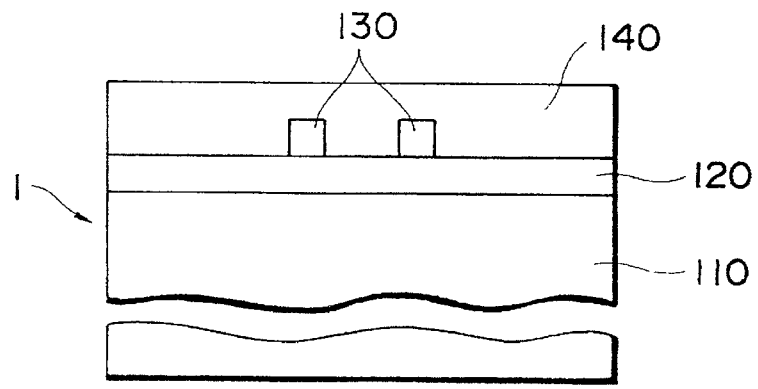
FIG. 9 is a view showing the sectional structure of a waveguide component shown in FIGS. 1 and 2 along the line IX—IX of FIG. 1.

FIG. 9 shows the structure of the waveguide component 1. FIG. 9 corresponds to the section of the waveguide component 1 of the optical waveguide module shown in FIG. 1 along the line IX—IX. This waveguide component 1 comprises a waveguide substrate 110 made of silicon or silica glass, a lower cladding layer 120 (glass material layer) formed on the waveguide substrate 110, the optical waveguides 130 (core or glass material layers) formed on the lower cladding layer 120 to have a predetermined shape, and an upper cladding layer 140 (glass material layer) covering the optical waveguides 130. The cladding layers 120 and 140 have refractive indices lower than that of the optical waveguides 130. The structure of the waveguide component 1 utilized in this optical waveguide module is not limited to the buried type waveguide component as shown in FIG. 9, but waveguide components (e.g., ridge type waveguides) having various types of structures, as disclosed in, e.g., "Optical Integrated Circuit" (published by Ohm Sha, Feb. 25, 1985, p. 204), can be adopted.

Figure 10:
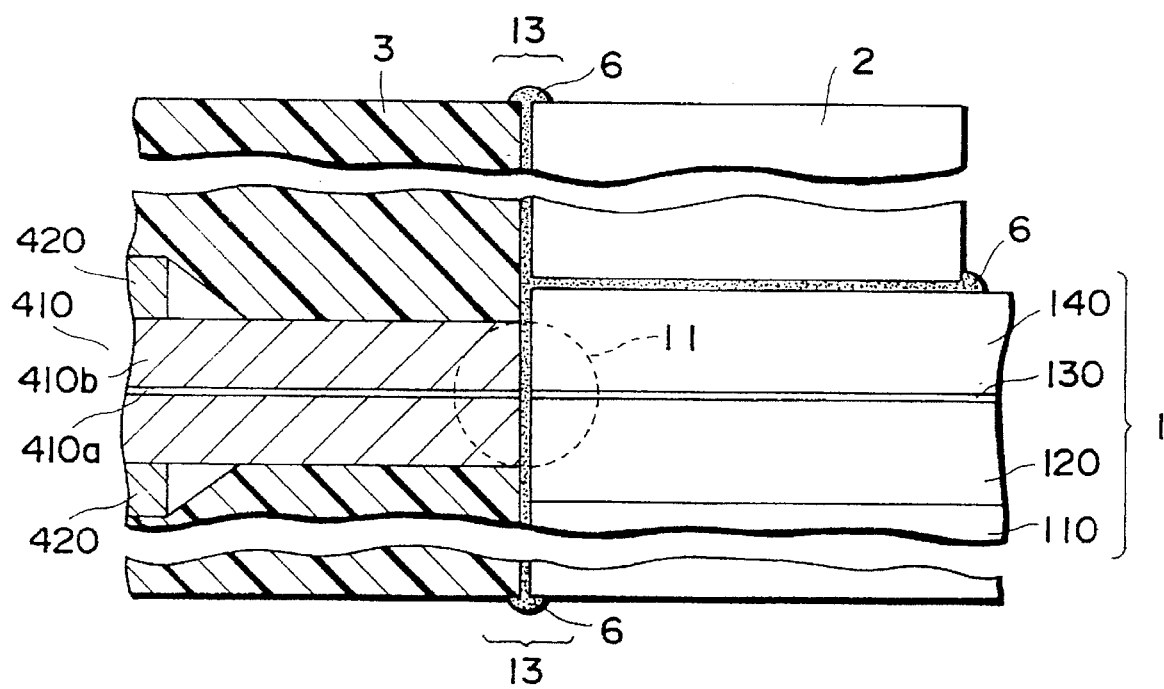
FIG. 10 is a view showing the sectional structure of the optical waveguide module shown in FIG. 2 along the line X—X of FIG. 2.

FIG. 10 is an enlarged sectional view of the connecting portion 13 of the buried type waveguide component 1 having a sectional structure shown in FIG. 9 and the ferrule 3 having the structure described above. This sectional view coincides the sectional view taken along the line X—X of FIG. 2. As shown in FIG. 10, the upper surface 1b of the waveguide component 1 and the bottom surface 2b of the reinforcing member 2, the adhering surface 1a of the waveguide component 1 and the adhering face 3c (a surface including the end faces of the cores of the optical fibers at the distal end portion of the ribbon fiber 4) of the ferrule 3, and the side surface 2a of the reinforcing member 2 and the adhering surface 3c of the ferrule 3 are adhered to each other with the ultraviolet-curing or thermosetting adhesive 6 having an adhesion strength of 50 kg/cm$^2$ or more with respect to silica glass. This alignment is an operation of causing the end faces of the cores 410a of the optical fibers, the distal ends of which are held by the ferrule 3, and the end faces of the optical waveguides 130 to coincide with the propagating direction of light. A region denoted by reference numeral 11 in FIG. 10 indicates a portion where the optical fibers and the optical waveguides 130 are optically connected to each other.

Figure 11:
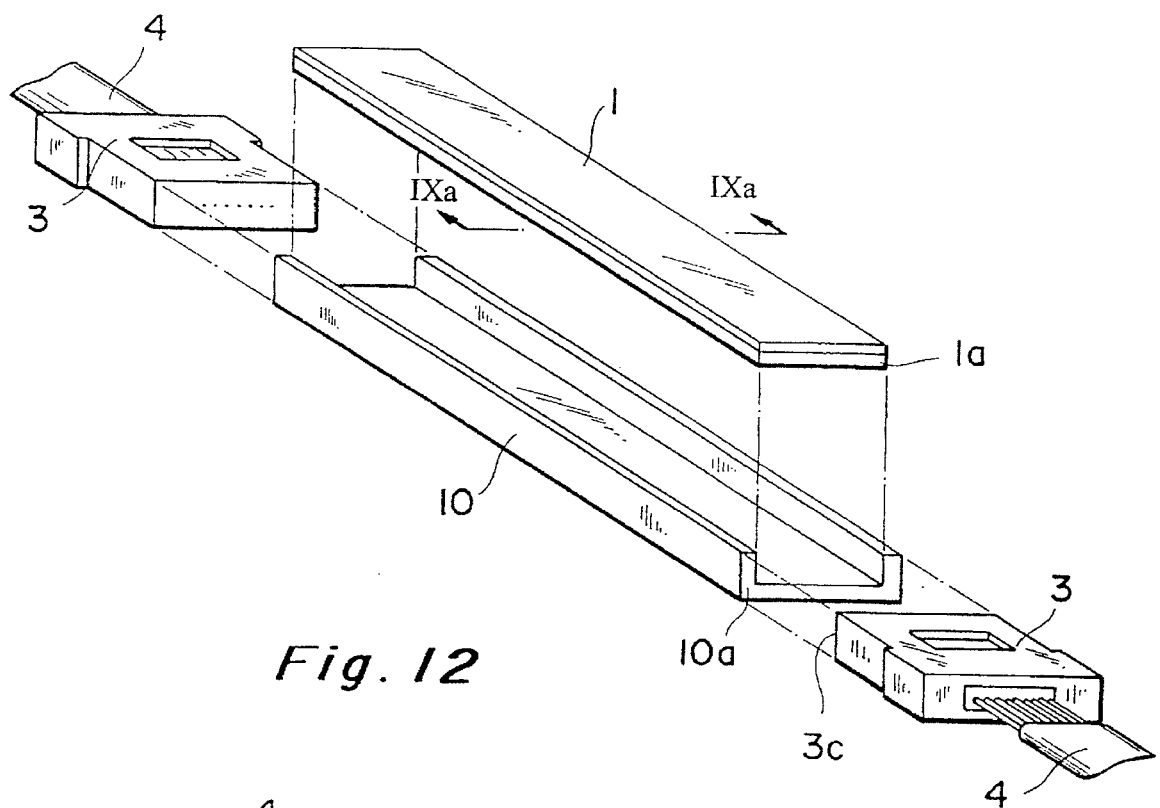
FIG. 11 is a view for explaining the assembling process of an optical waveguide module according to the second embodiment of the present invention.
Figure 12:
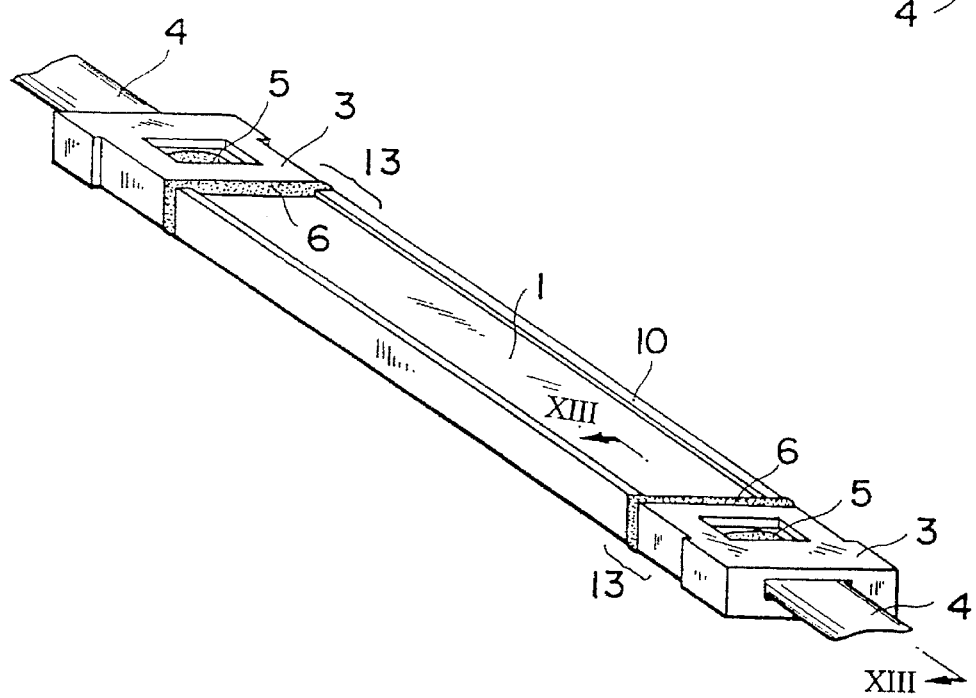
FIG. 12 is a perspective view showing the structure of the optical waveguide module according to the second embodiment of the present invention.

Furthermore, although the structure of the connecting portion 13 of the waveguide component 1 and the ferrule 3 of this optical waveguide module is reinforced by the reinforcing member 2, as shown in FIGS. 1 and 2, this reinforcing structure is not limited to the first embodiment. For example, a waveguide component 1 may be fixed on a support member 10, as shown in FIGS. 11 and 12, thereby reinforcing the strength of an adhering portion 13 of the waveguide component 1 with a ferrule 3. This support member 10 is also made of the same material as that of the waveguide substrate 110, e.g., silicon or silica glass. The section of the waveguide component 1 of FIG. 11 along the line IXa—IXa coincides with the section of the buried type waveguide component shown in FIG. 9.

Figure 13:
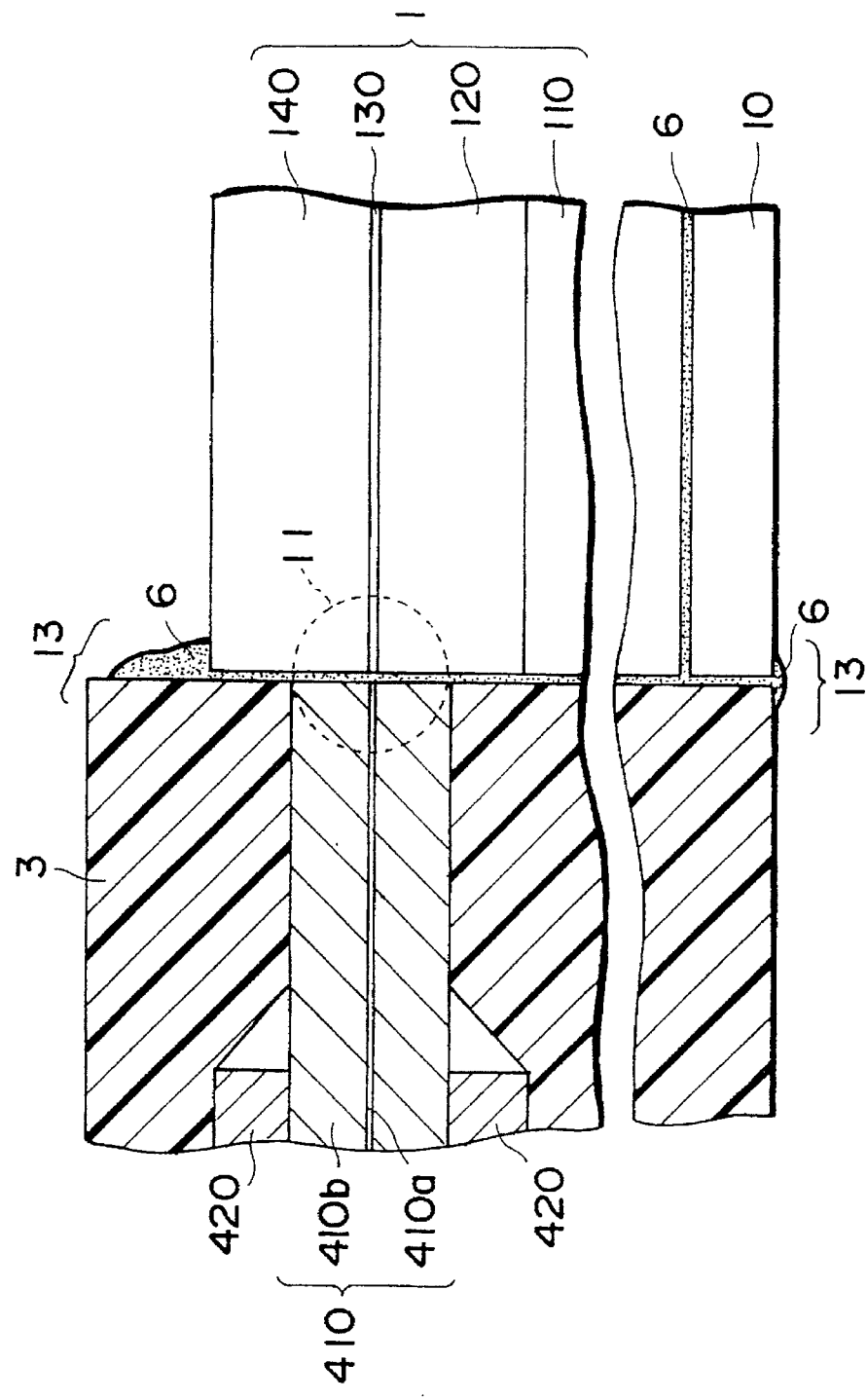
FIG. 13 is a view showing the sectional structure of the optical waveguide module shown in FIG. 12 along the line XIII—XIII of FIG. 12.

In order to describe the structure of the connecting portion 13 of the optical waveguide module according to the second embodiment of the present invention shown in FIG. 12, the sectional view of the connecting portion 13 along the line XIII—XIII of FIG. 12 is shown in FIG. 13. In the second embodiment, the waveguide component 1 and the support member 10 are fixed to each other by adhesion with an adhesive 6, and an adhering end face 10a of the support member 10 is polished simultaneously during polishing the end face of the waveguide component 1 described above.

Figure 14:
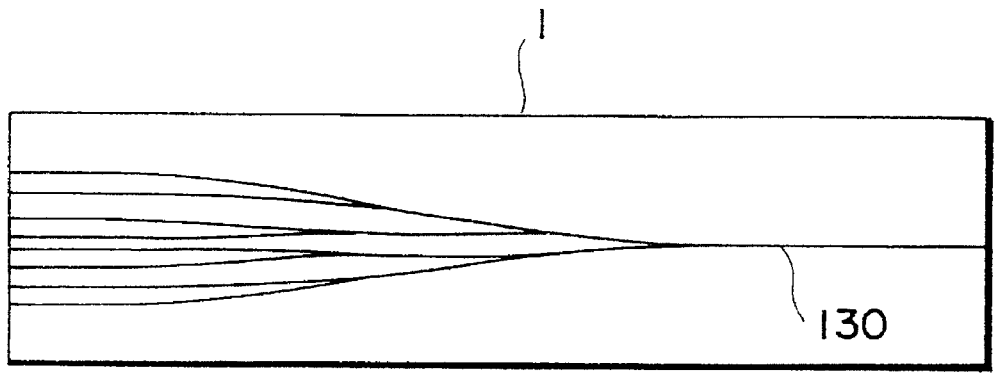
FIG. 14 is an exposed plan view showing a waveguide pattern (No. 1) formed on a waveguide component.
Figure 15:
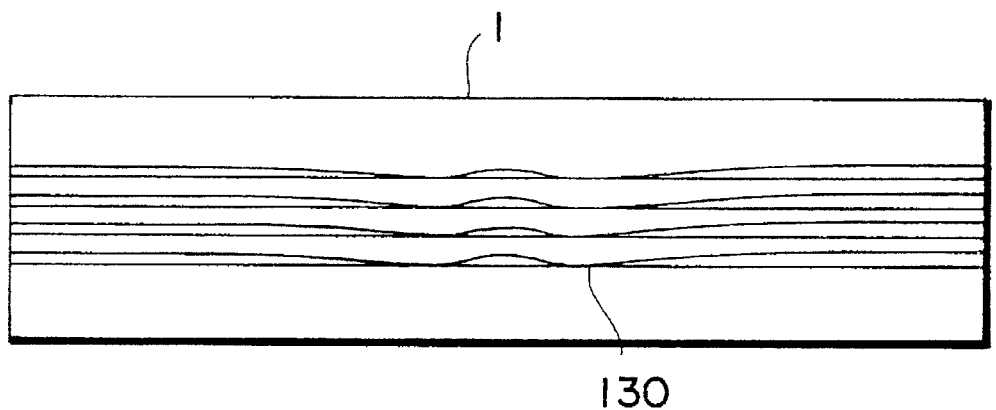
FIG. 15 is an exposed plan showing a waveguide pattern (No. 2) formed on a waveguide component.
Figure 16:
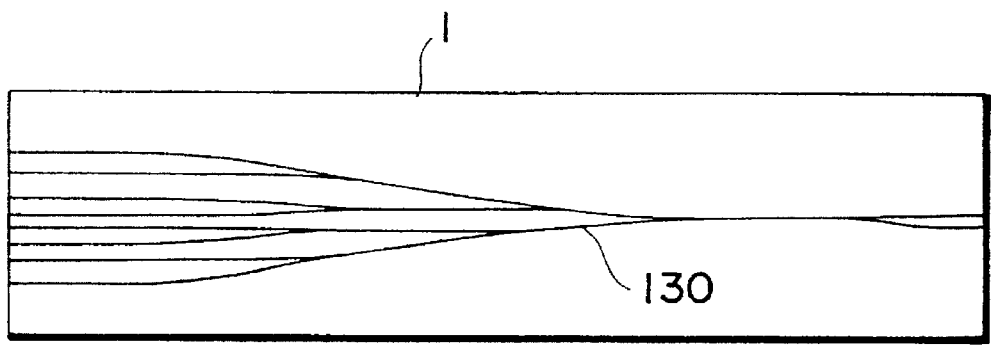
FIG. 16 is an exposed plan showing a waveguide pattern (No. 3) formed on a waveguide component.

FIGS. 14 to 16 show the shapes of various types of optical waveguides 130 formed in the waveguide component 1. Each of FIGS. 14 to 16 shows a waveguide component 1, from which an upper cladding layer 140 is removed, when viewed from the top. In this manner, as the shapes of the optical waveguides 130 formed in the waveguide component 1, optical waveguide patterns are available for realizing optical communication (including optical branching and coupling functions) in various types of modes, e.g., one vs. a multiple of optical waveguides (FIG. 14), a multiple of optical waveguides vs. a multiple of optical waveguides (FIG. 15), and two vs. a multiple of optical waveguides (FIG. 16).

Figure 17:
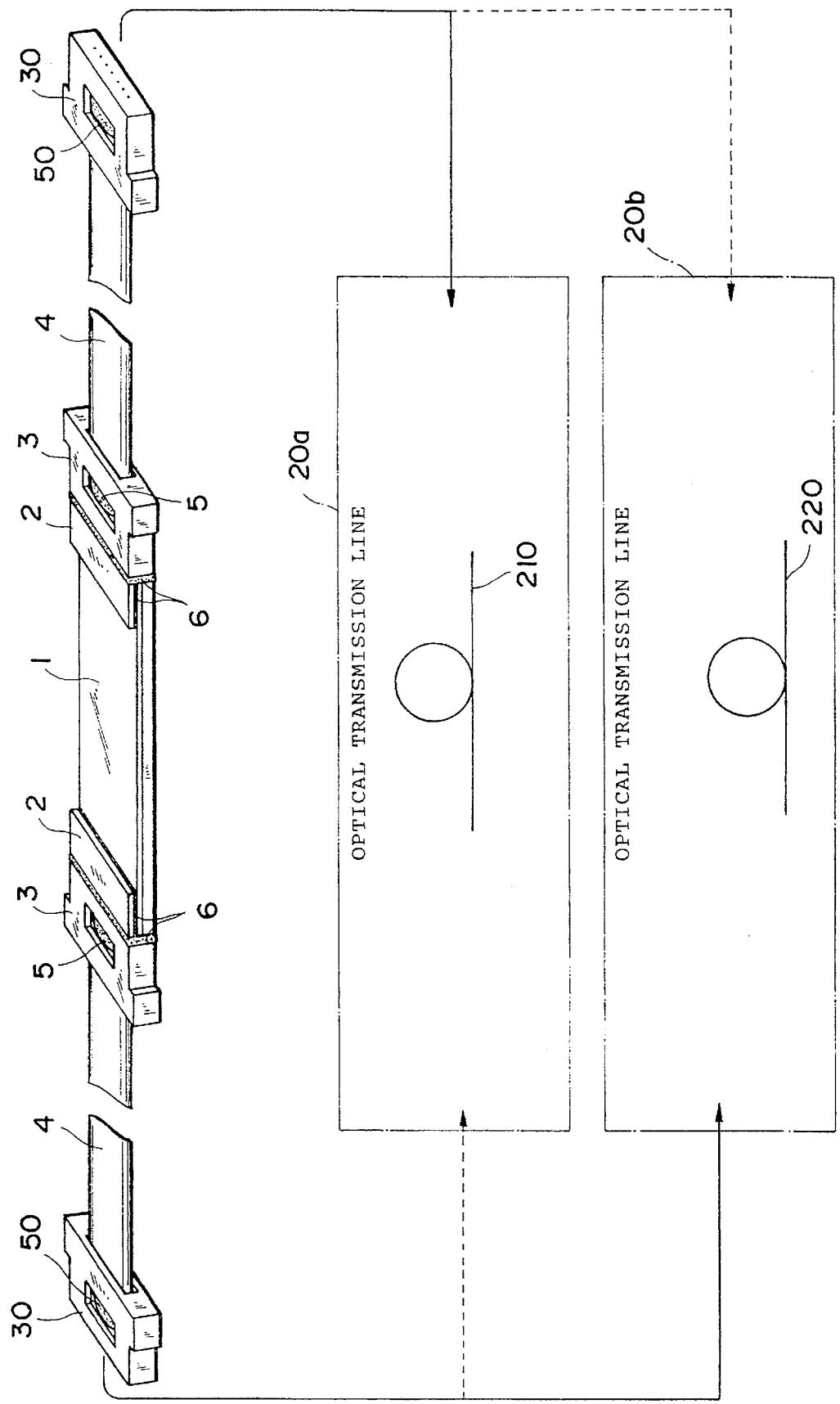
FIG. 17 is a view showing the entire arrangement of an optical communications system comprising optical waveguide modules according to the present invention.

This optical waveguide module serves as a part of the optical communications systems 20a and/or 20b, as a matter of course. Accordingly, this optical waveguide module has input/output optical fibers to easily realize optical coupling with other transmission lines, as shown in FIG. 17. In this case, this optical waveguide module has a waveguide component 1 identical to those described above, ferrules 3 fixed to the waveguide component 1 by adhesion, and the input/output optical fibers (in this embodiment, multi-fiber ribbon fibers 4) adhered to the ferrules 3 while their distal ends are inserted in and adhered with through holes 340 of the ferrules 3 with an adhesive 5. In particular, the other end of each of the input/output ribbon fibers 4 is fixed to another ferrule 30 by adhesion with an adhesive 50 to enable optical coupling with a transmission line in the network 20a or 20b. These transmission lines 20a and 20b include, in addition to optical fibers 210 and 220 for propagating optical signals, transmitters, optical amplifiers, optical multiplexers/demultiplexers, receivers, and the like.

As described above, the optical waveguide module optically coupled to at least one of the optical networks 20a and 20b constitutes part of the transmission line. The optical waveguide module provided as part of the transmission line is accommodated in a case having a predetermined case, as disclosed in, e.g., Japanese Patent Laid-Open No. 62-73210, to protect its connecting portion 13. This optical waveguide module may be protected by being molded with a resin, as disclosed in European Patent Laid-Open No. 0 422 445 A1.

Materials respectively forming the waveguide substrate 110 constituting part of the waveguide component 1 and the ferrule 3 will be described with particular regard to their thermal expansion coefficients and modulus of elasticity.

Figure 18:
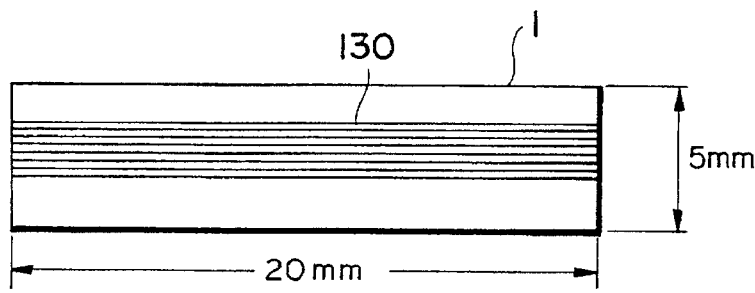
FIG. 18 is a view showing the waveguide pattern of a waveguide component fabricated as an experimental sample.

First, variations in coupling loss caused by the thermal expansion of the respective materials of the waveguide component 1 and of the connecting portion 13 that holds the distal ends of the optical fibers of the ribbon fiber 4 will be described. A planar waveguide component obtained by forming eight linear optical waveguides (core diameter: 7 μm×7 μm, difference in specific refractive index: 0.3%) on a silicon (Si) substrate at a pitch of 250 μm was prepared so that variations in loss caused by the optical waveguides 130 need not be considered. FIG. 18 shows the shape of the optical waveguides of this waveguide component. The ferrule 3 made of a plastic material having a different thermal expansion coefficient from that of the waveguide component having this silicon substrate was prepared. The cores of the optical fibers held by the ferrule 3 were placed in opposing positons to the optical waveguides 130 and aligned with them, and the optical fibers were fixed with an ultraviolet-curing adhesive. Several types of samples (optical waveguide modules for comparison of characteristics) were fabricated in this manner. As the adhesive, one having a breaking strength of 100 kg/cm$^2$ or more with respect to silica glass was utilized to avoid, as much as possible, variations caused by insufficient strength of the adhesive. An adhesion strength of at least 50 kg/cm$^2$ suffices.

Table 1 shows the materials used in the fabricated ferrules and the values representing their physical properties.

TABLE 1

|  | Silicon (Si) | Silica glass (SiO$_2$) | Multi-Component Glass | Plastic 1 | Plastic 2 | Plastic 3 | Plastic 4 |
|---|---|---|---|---|---|---|---|
| Thermal Expansion Coefficient (×10$^{-6}$/°C.) | 2.4 | 0.5 | 2.4 | 14.2 | 6.0 | 5.3 | 4.5 |
| Modulus of Elasticity (kg/mm$^2$) | 4,000 | 7,000 | 3,600 | 2,000 | 2,500 | 2,800 | 3,300 |
| Ratio of Modulus of Elasticity to That of Silicon | 1 | 0.57 | 1.11 | 2.00 | 1.60 | 1.43 | 1.21 |
| Ratio of Modulus of Elasticity to That of Silica | 1.75 | 1 | 1.94 | 3.50 | 2.80 | 2.50 | 2.12 |
| Content of Filler (weight %) | — | — | — | 70 | 90 | 92 | 94 |

Figure 19:
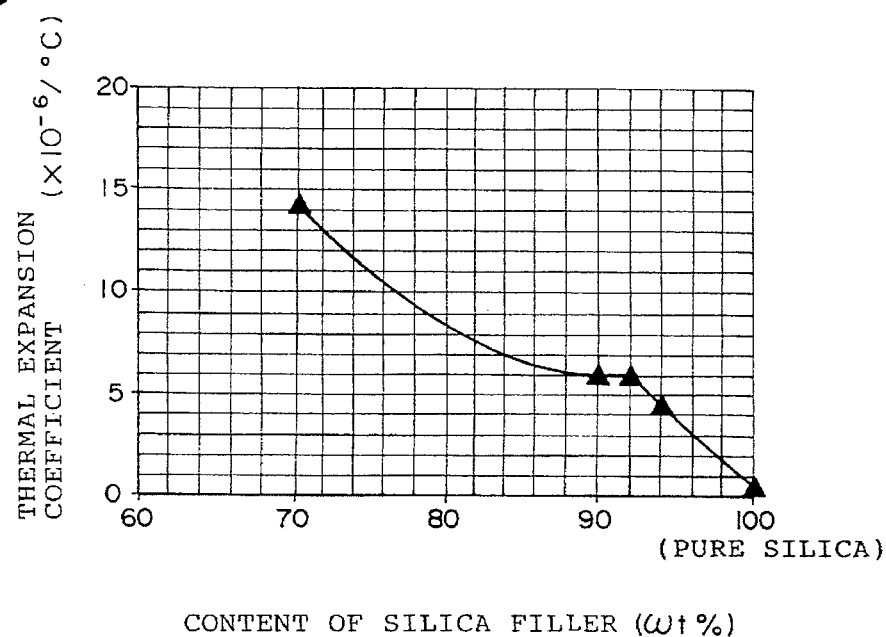
FIG. 19 is a graph showing the relationship between the content of silica filler (weight %) and a thermal expansion coefficient ($10^{-6}$/°C.) as the values representing the physical properties of a material (plastic) forming a ferrule.
Figure 20:
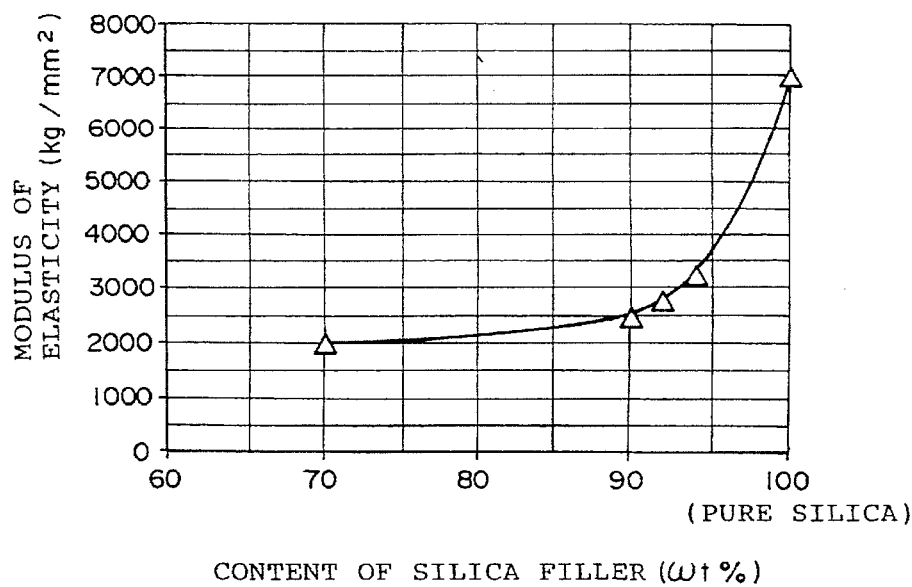
FIG. 20 is a graph showing the relationship between the content of silica filler (weight %) and a modulus of elasticity (kg/mm$^2$) as the values representing the physical properties of the material (plastic) forming the ferrule.
Figure 21:
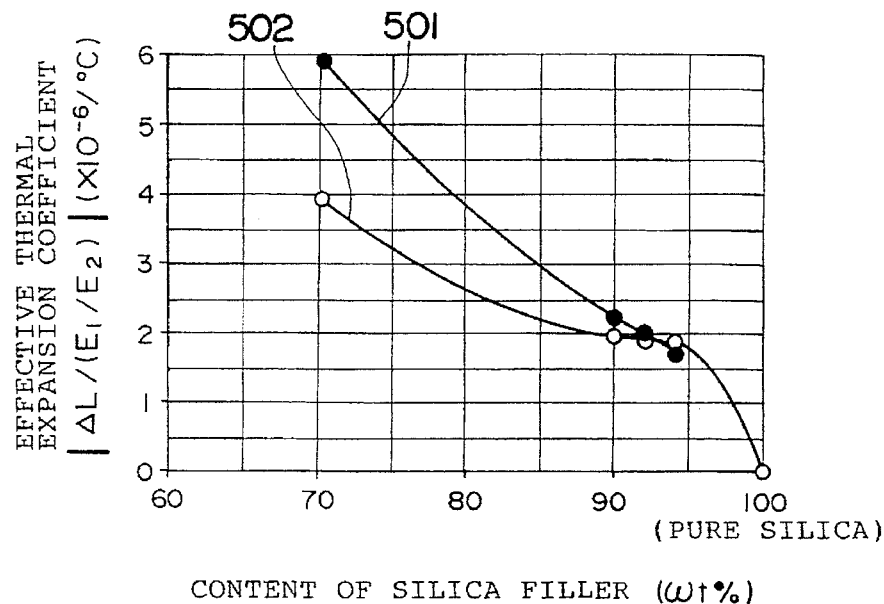
FIG. 21 is a graph showing the relationship between the content of silica filler (weight %) and an effective thermal expansion coefficient ($|\Delta L/(E_1/E_2)|$) as the values representing the physical properties of the material (plastic) forming the ferrule.

FIGS. 19 and 20 show the values representing physical properties of plastics 1 to 4 shown in Table 1. In particular, in FIG. 19, the axis of abscissa represents the amount (weight %, expressed as wt % in FIG. 19) of the contained silica filler, and the axis of ordinate represents the thermal expansion coefficient (10$^{-1}$/°C.) of the plastic material. In FIG. 20, the axis of abscissa represents the amount (weight %, expressed as wt % in FIG. 20) of the contained a silica filler, and the axis of ordinate represents the modulus of elasticity (kg/mm$^2$) of the plastic material. As is seen from FIGS. 19 and 20, when the content of the silica filler increases, the modulus of elasticity of the plastic material is increased, while the thermal expansion coefficient thereof is decreased. FIG. 21 shows the effective thermal expansion coefficient $|L/(E_1/E_2)|$ of each plastic material with respect to the amount (weight %) of the contained silica filler. In FIG. 21, a curve 501 (plotted by solid circles) indicates the effective thermal expansion coefficients of the respective plastic materials with respect to silicon (Si), and a curve 502 (plotted by hollow circles) indicates the effective thermal expansion coefficients of the respective plastic materials with respect to silica glass (SiO$_2$). In the above formula showing the effective thermal expansion coefficient, $\Delta L$ indicates a difference in thermal expansion coefficient between silicon or silica glass (material that forms the waveguide substrate) and each plastic material (material forming the ferrule), $E_1$ indicates the modulus of elasticity of silicon or silica glass, and $E_2$ indicates the modulus of elasticity of each plastic material. Therefore, from FIG. 21, it is seen that 85 weight % or more of silica filler must be contained to obtain a plastic material having an effective thermal expansion coefficient of 3×10$^{-6}$ °C.$^{-1}$ or less with respect to the silicon substrate, and that 75 weight % or more of silica filler must be contained to obtain a plastic material that has an effective thermal expansion coefficient of 3×10$^{-6}$ °C.$^{-1}$ or less with respect to the silica glass substrate.

The thermal expansion coefficient of a plastic material containing 75 weight % or more of a silica filler is 10×10$^{-1}$ °C.$^{-1}$ or less, and the thermal expansion coefficient of a plastic material containing 85 weight % or more of a silica filler is 6×10$^{-6}$ °C.$^{-1}$ or less. Since the theoretical limit value of the content of the silica filler is 96 volume %, as described previously, the thermal expansion coefficient of the plastic material is 3×10$^{-6}$ °C.$^{-1}$ or more (see FIG. 19). Roughly, the 96 volume % as the silica filler content can be regarded as the 96 weight % as the silica filler content.

Figure 22:
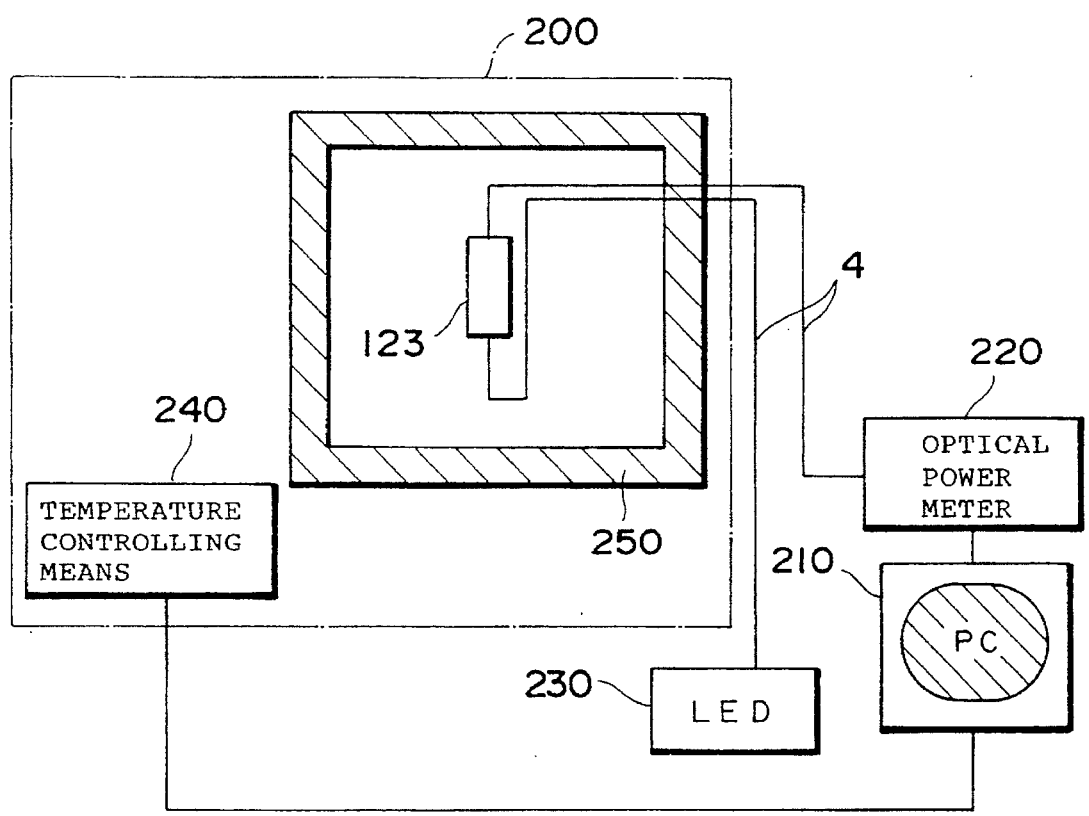
FIG. 22 is a diagram showing the arrangement of a measuring system that measures the temperature characteristics of the optical waveguide module according to the present invention.
Figure 23:
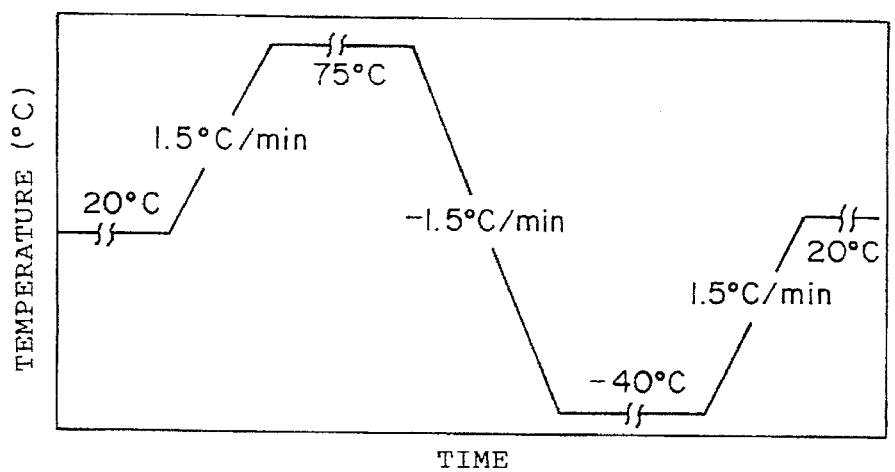
FIG. 23 is a graph showing the pattern of temperature variations obtained by the measuring system shown in FIG. 22.

A change in loss caused by temperature variations was evaluated by using a measuring system shown in FIG. 22. An optical waveguide module 123 to be measured is accommodated in a temperature-controlled bath 250 of an environment unit 200. While light having a predetermined intensity is supplied from an LED 230 to input/output optical fibers on one side (optically connected to the input end faces of the optical waveguides), the intensities of light passing through the optical waveguides and then through the input/optical fibers on the other side (optically connected to the output end faces of the optical waveguides 130) are measured by an optical power meter 220, thereby obtaining the variation amount of the coupling loss caused by temperature variations. The optical power meter 220 is controlled by a personal computer 210 (PC). The temperature in the temperature-controlled bath 250 is adjusted by a temperature controlling means 240 so that it changes as is shown in FIG. 23. The temperature controlling means 240 is also controlled by the personal computer 210. More specifically, the temperature changes between −40° C. and +75° C., and the rate of change is ±1.5° C./min. Table 2 shows the variation amount of the coupling loss occurring between the waveguide component and the ferrule caused by the above temperature change.

For this measurement, four samples are prepared for each combination of materials.

TABLE 2

| Combination of Materials (Material of Substrate/ Material of Ferrule) | Maximum Variation (dB) | Minimum Variation (dB) | Average (dB) |
| --- | --- | --- | --- |
| Si/Plastic 1 | 0.39 | 0.27 | 0.33 |
| Si/Plastic 2 | 0.14 | 0.07 | 0.10 |
| Si/Si | 0.08 | 0.03 | 0.05 |
| Si/Plastic 3 | 0.12 | 0.05 | 0.07 |
| Si/Plastic 4 | 0.10 | 0.04 | 0.05 |

When the materials forming the waveguide substrate 110 and the ferrule 3 are the same (e.g., Si/Si: a case wherein the material of both the substrate and ferrule is silicon), it is ideal as there is no thermal expansion coefficient difference due to the material. In this case, the variation amount in coupling loss will be almost less than 0.1 dB. In the case of "Si/Si" shown in Table 2, which is an example of such a case, the variation amount in coupling loss is 0.08 dB. When the difference in thermal expansion coefficient between the two materials is large, e.g., in the case of "Si/plastic 1" shown in Table 2, the variation amount in coupling loss becomes considerably large, as a matter of course.

Figure 24:
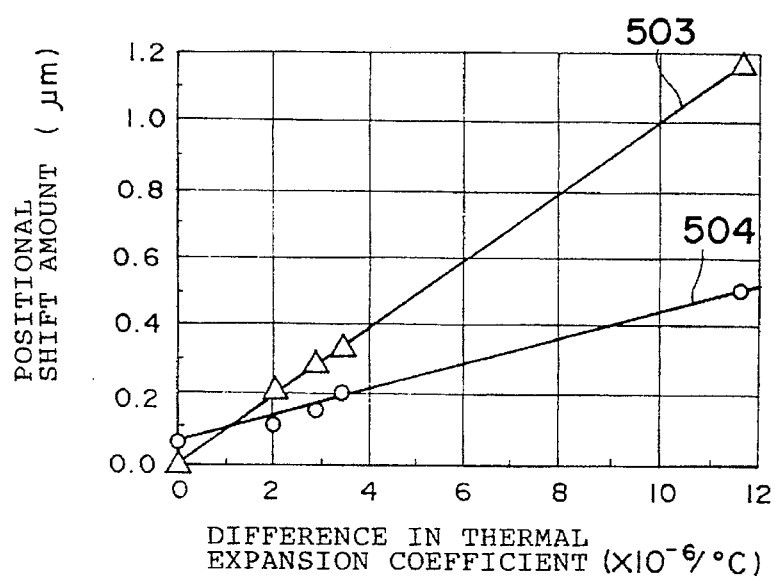
FIG. 24 is a graph showing the relationship between a difference in the thermal expansion coefficient (calculated value and actually measured value) between a material forming a waveguide substrate and a material forming the ferrule, as plotted with respect to the positional shift amount of the cores at the adhering portion of an optical waveguide module constituted by using a waveguide substrate and ferrule prepared from these materials.

FIG. 24 is a graph showing the positional shift amount between the waveguide component 1 and the optical fibers fixed by a ferrule 3, which is obtained by calculation based on the variation amount in this coupling loss, as a function of the thermal expansion coefficient. In FIG. 24, a line segment obtained by plotting the calculated values of the positional shift amount is indicated by reference numeral 503, and a line segment obtained by plotting the experimental values of the positional shift amount is indicated by reference numeral 504. As is seen from FIG. 24, the actual positional shift is smaller than the value obtained by calculation. This is supposed to be due to a relative decrease in positional shift amount caused by elastic deformation of both the material of the waveguide substrate and the material of the ferrule.

Figure 25:
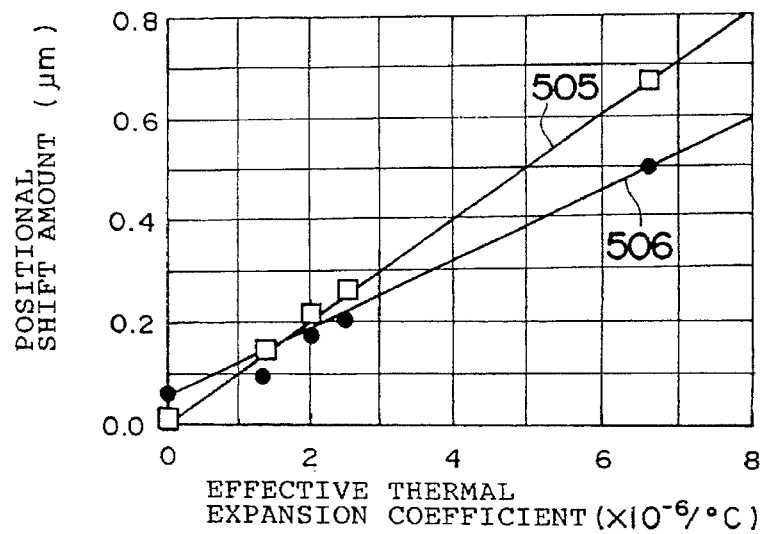
FIG. 25 is a graph showing the relationship between the effective thermal expansion coefficient (calculated value and actually measured value) of the material forming the ferrule with respect to the material forming the waveguide substrate and the positional shift amount of the cores at the adhering portion of the optical waveguide module constituted by using a waveguide substrate and ferrule prepared from these materials.

The proportion of suppression of the positional shift amount caused by elastic deformation is determined by the ratio of the modulus of elasticity of the material forming the waveguide substrate 110 to the modulus of elasticity of the material forming the ferrule 3 connected to this waveguide component 1. FIG. 25 shows the positional shift amount calculated by considering this ratio of the modulus of elasticity of the material forming the waveguide substrate 110 to the modulus of elasticity of the material forming the ferrule 3. In FIG. 25, a line segment obtained by plotting the calculated values of the positional shift amount is indicated by reference numeral 505, and a line segment obtained by plotting the experimental values of the positional shift amount is indicated by reference numeral 506. When elastic deformation is considered in this manner, the positional shift amount obtained by calculation coincides with the actual value In FIG. 25, the axis of abscissa represents the effective thermal expansion coefficient (the ratio of a difference in thermal expansion coefficient between the materials forming the waveguide substrate and the ferrule to the ratio of the modulus of elasticity of the material forming the waveguide substrate to the modulus of elasticity of the material forming the ferrule) .

From the results of the above study, it is apparent that even when the ferrule 3 is formed by using a material having a different thermal expansion coefficient from that of the material forming the waveguide substrate 110, the actual positional shift can be suppressed by utilizing elastic deformation of the respective materials. Accordingly, if the positional shift amount is about 1 μm, the variation amount in coupling loss can be suppressed to about 0.3 dB, from the relationship shown in FIG. 29.

The tolerance of positional shift also depends on the gaps among the cores of the optical fibers (in this embodiment, a multi-fiber ribbon fiber 4) held by the ferrule 3. For example, in a multi-fiber ribbon fiber in which 16 cores are arranged at a pitch of 250 μm, the distance between the cores at the two ends is 3.75 mm. In order to suppress the positional shift amount within 1 μm in, e.g., an environment whose temperature varies by 100° C., the conditions which are mentioned previously must be satisfied. More specifically, assuming that the difference in thermal expansion coefficient between the material forming the waveguide substrate 110 and the material forming the ferrule 3 is ΔL, that the modulus of elasticity of the material forming the waveguide substrate 110 is $E_1$, and that the modulus of elasticity of the material forming the ferrule 3 is $E_2$, the value of the effective thermal expansion coefficient $|\Delta L/(E_1/E_2)|$ of the material forming the ferrule 3 with respect to the material forming the waveguide substrate 110 must be set to less than $3.0 \times 10^{-6}$ °C.$^{-1}$ Preferably, it is set to less than $2.7 \times 10^{-1}$ °C.$^{-1}$.

Generally, silicon or silica glass is used as the material of the waveguide substrate 110 constituting part of the waveguide component 1. Currently, a structure obtained by forming buried type silica glass-based waveguides on this waveguide substrate has extensively been developed, since its coupling loss with respect to optical fibers is low and the transmission loss of its interior is small. The physical properties of these material are shown in Table 1 described above.

A phenol-based epoxy resin containing a silica glass filler is often used in the manufacture of the ferrule 3. The thermal expansion coefficient of this material can be changed by changing the content of the filler and the like. The modulus of elasticity of the epoxy resin can be adjusted within the range of 1,500 to 5,000 kg/mm$^2$ by adjusting the content of the filler. Assuming a case wherein the waveguide component 1 is formed of silicon or silica glass, if the ferrule 3 is manufactured by using a material whose modulus of elasticity falls within the above range of the above effective thermal expansion coefficient, the thermal expansion coefficient of this material must be set to $10 \times 10^{-6}$ °C.$^{-1}$ or less.

From the result of this study, it is apparent that even if a resin, e.g., a material having a comparatively large thermal expansion coefficient (e.g., $20 \times 10^{-6}$ °C.$^{-1}$), other than the phenol-based epoxy resin described above is used, as far as its modulus of elasticity is sufficiently small, e.g., 500 kg/mm$^2$ or less, the positional shift between the cores caused by temperature fluctuation can be sufficiently suppressed. For example, in manufacturing the waveguide substrate 110 with silica glass, assuming that the material forming the ferrule 3 has a modulus of elasticity of 50 kg/mm$^2$ or less, even if the difference in thermal expansion coefficient between the material of the ferrule 3 and silica glass is about $4 \times 10^{-4}$ °C.$^{-1}$, a difference in effective thermal expansion coefficient obtained by considering actual elastic deformation is less than $3 \times 10^{-6}$ °C.$^{-1}$ A resin having a difference in thermal expansion coefficient of this level includes, e.g., LCR305 manufactured by ICI.

When forming the ferrule 3 by utilizing such a resin, a following problem is anticipated to arise. That is, since the modulus of elasticity of the material itself is low, elastic deformation occurs when fixing the ferrule 3 to a jig or the like during alignment, leading to positional shift between cores. This problem is supposed to be solved by improving the handing scheme (e.g., surface fixing to the jig).

A plurality of optical waveguide modules manufactured based on the above study will be described in detail.

SAMPLE 1

Figure 26:
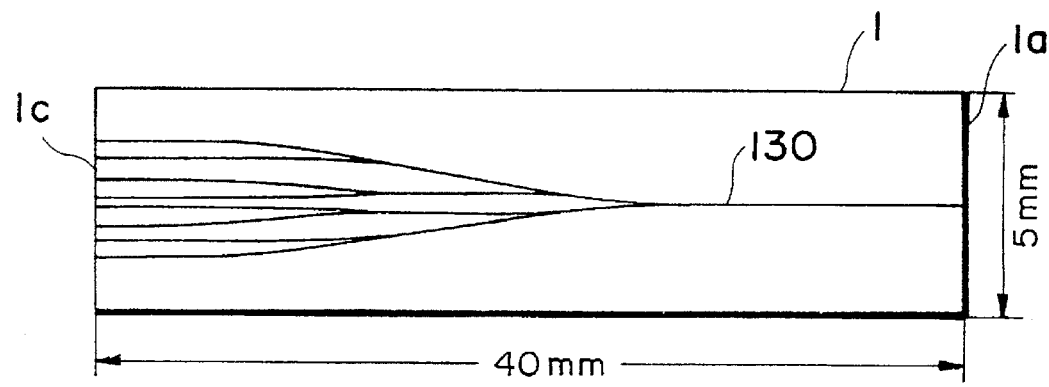
FIG. 26 is a view showing a waveguide pattern of a waveguide component fabricated as an example of the optical waveguide module according to the present invention.

In sample 1, as the material forming a ferrule 3, a phenol-based epoxy resin material having a thermal expansion coefficient of $6.0\times10^{-6}$ $°C.^{-1}$ and a modulus of elasticity of 2,500 kg/mm$^2$ was used. The effective thermal expansion coefficient of this material with respect to silicon is $2.25\times10^{-6}$ $°C.^{-1}$ A waveguide component 1 was fabricated by forming an 8-branched single-mode optical waveguide 130 on a waveguide substrate 110 which was formed by combining FHD and RIE. FIG. 26 shows the shape of the waveguide of the manufactured optical waveguide 130. A ferrule 3 holding one optical fiber (the distal end portion of this optical fiber is fixed to the ferrule with an adhesive) and a ferrule 3 holding a ribbon fiber on which eight optical fibers are arranged and fixed at a pitch of 250 µm (the distal end portion of this ribbon fiber was fixed to the ferrule with an adhesive) were respectively connected to input/output end faces 1a and 1c of the waveguide component 1. Five optical waveguide modules each obtained in this manner were fabricated as Sample 1. Alignment had been performed in accordance with the method already described above. As the adhesive used for adhering the waveguide component 1 with the respective ferrules 3, an ultraviolet-curing adhesive having an adhesion strength of 100 kg/cm$^2$ or more with respect to silica glass was employed. In this sample, the ultraviolet-curing adhesive is doped with a thermosetting catalyst, thereby the adhesive has a predetermined thermosetting property.

The optical waveguide modules (Sample 1) obtained in the above manner had an insertion loss of 10.1 dB at average and an excessive loss (a total transmission loss including branching loss and the like in the optical waveguide 130) of 1.1 dB. These optical waveguide modules (Sample 1) were measured by employing the measuring system shown in FIG. 22 within a temperature range of –40° to 75° C. with a temperature change pattern shown in FIG. 23. As measurement light, light having a wavelength of 1.3 µm was used. As the result of this measurement, it was confirmed that the respective optical waveguide modules of Sample 1 had good temperature characteristics with the variation amount in coupling loss of 0.2 dB at average and 0.3 dB at maximum.

SAMPLE 2

Optical waveguide modules of Sample 2 fabricated by utilizing a plastic material having different physical properties from those of the ferrule of sample 1 will be described.

In Sample 2, as the material to form a ferrule 3, a phenol-based epoxy resin material having a thermal expansion coefficient of $4.5\times10^{-1}$ $°C.^{-1}$ and a modulus of elasticity of 3,300 kg/mm$^2$ was used. The effective thermal expansion coefficient of this material with respect to silicon is $1.74\times10^{-6}$ $°C.^{-1}$ A waveguide component 1 was fabricated by forming an 8-branched single-mode optical waveguide 130 on a waveguide substrate 110 which was formed by combining FHD and RIE. FIG. 26 shows the shape of the waveguide of the manufactured optical waveguide 130. A ferrule 3 holding one optical fiber (the distal end portion of this optical fiber is fixed to the ferrule with an adhesive) and a ferrule 3 holding a ribbon fiber on which eight optical fibers are arranged and fixed at a pitch of 250 µm (the distal end portion of this ribbon fiber was fixed to the ferrule with an adhesive) were respectively connected to input/output end faces 1a and 1c of the waveguide component 1. Five optical waveguide modules each obtained in this manner were fabricated as Sample 2. Alignment had been performed in accordance with the method already described above. As the adhesive used for adhering the waveguide component 1 with the respective ferrules 3, an ultraviolet-curing adhesive having an adhesion strength of 100 kg/cm$^2$ or more with respect to silica glass was employed. In this sample, the ultraviolet-curing adhesive is doped with a thermosetting catalyst, thereby the adhesive has a predetermined thermosetting property.

The optical waveguide modules (Sample 2) obtained in the above manner had an insertion loss of 10.0 dB at average and an excessive loss of 1.0 dB. These optical waveguide modules (Sample 2) were measured by employing the measuring system shown in FIG. 22 within a temperature range of –40° to 75° C. with a temperature change pattern shown in FIG. 23. As measurement light, light having a wavelength of 1.3 µm was used. As the result of this measurement, it was confirmed that the respective optical waveguide modules of Sample 2 had good temperature characteristics with the variation amount in coupling loss of 0.2 dB at average and 0.25 dB at maximum.

SAMPLE 3

Optical waveguide modules each obtained by fixing, by adhesion, one of the following plastic ferrules on a waveguide component 1 constituted by a silica glass substrate will be described.

In Sample 3, as the material to form the ferrule 3, a phenol-based epoxy resin material having a thermal expansion coefficient of $4.5\times10^{-6}$ $°C.^{-1}$ and a modulus of elasticity of 3,300 kg/mm$^2$ was used. The effective thermal expansion coefficient of this material with respect to silica glass is $1.89\times10^{-6}$ $°C.^{-1}$ The waveguide component 1 was fabricated by forming an 8-branched single-mode optical waveguide 130 on a waveguide substrate 110 which was formed by combining FHD and RIE. FIG. 26 shows the shape of the waveguide of the manufactured optical waveguide 130. A ferrule 3 holding one optical fiber (the distal end portion of this optical fiber is fixed to the ferrule with an adhesive) and the ferrule 3 holding a ribbon fiber on which eight optical fibers are arranged and fixed at a pitch of 250 µm (the distal end portion of this ribbon fiber was fixed to the ferrule with an adhesive) were respectively connected to input/output end faces 1a and 1c of the waveguide component 1. Five optical waveguide modules each obtained in this manner were fabricated as Sample 3. Alignment had been performed in accordance with the method already described above. As the adhesive used for adhering the waveguide component 1 with the respective ferrules 3, an ultraviolet-curing adhesive having an adhesion strength of 100 kg/cm$^2$ or more with respect to silica glass was employed.

The optical waveguide modules (Sample 3) obtained in the above manner had an insertion loss of 10.6 dB at average and an excessive loss of 1.6 dB. These optical waveguide modules (Sample 3) were measured by employing the measuring system shown in FIG. 22 within a temperature range of –40° to 75° C. with a temperature change pattern shown in FIG. 23. As measurement light, light having a wavelength of 1.3 µm was used. As the result of this measurement, it was confirmed that the respective optical waveguide modules of Sample 3 had good temperature characteristics with the variation amount in coupling loss of 0.11 dB at average and 0.18 dB at maximum. The temperature characteristics of Sample 3 are further superior to those of Samples 1 and 2 described above. This is supposed to be due to a decrease in stress applied to the waveguide substrate 110 and waveguide glass layers (120, 130, and 140), which is caused by employing silica glass as the material of the waveguide substrate 110.

As shown by the above results, each of Samples 1 to 3 satisfies the specifications of the temperature characteristics of a component capable of being used indoors (10 cycles (48 hours) with temperature fluctuation from −10° C. to 60° C.) and the specifications of the temperature characteristics of TR-NWT-001209 manufactured by Bellcore (42 cycles (336 hours) with temperature variations from −40° C. to 75° C.) described above.

A comparative example will be described. The material to form the ferrule of this comparative example is a plastic material having a thermal expansion coefficient of $15.2 \times 10^{-6}$ °C.$^{-1}$ and a modulus of elasticity of 2,000 kg/mm$^2$. The effective thermal expansion coefficient of this material with respect to silicon (the material of the substrate) is $6.6 \times 10^{-6}$ °C.$^{-1}$, which exceeds $3.0 \times 10^{-6}$ °C.$^{-1}$. In the same manner as in the above examples, five optical waveguide modules were fabricated each by fixing by adhesion a waveguide component 1 having an 8-branched optical waveguide 130 and a ferrule made of the above plastic material with each other. The insertion loss and excessive loss at room temperature were 10.0 dB and 1.0 dB, respectively, exhibiting low loss characteristics. However, when these optical waveguide modules were placed in an environment where the temperature varies in the same manner as in the above examples, the variation amount in loss was 0.8 dB at maximum, which was twice or more that of the above examples. This is believed to be caused by an increase in positional shift between the cores due to thermal expansion accompanying the temperature variations.

Figure 27:
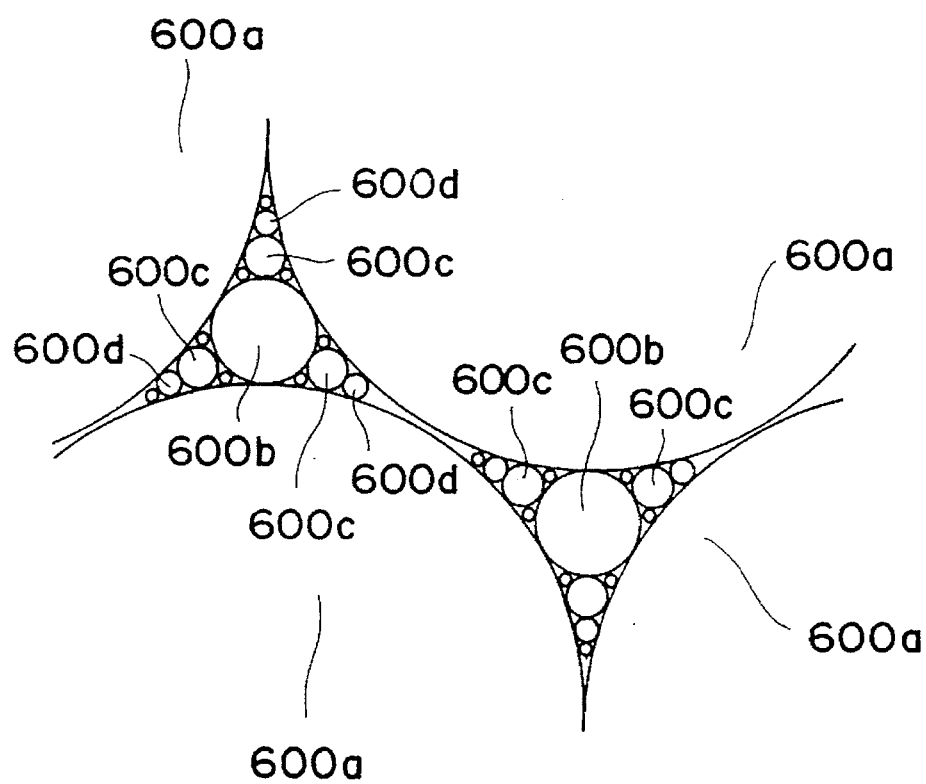
FIG. 27 is a conceptual view schematically showing the packing model of the silica filler.
Figure 28:
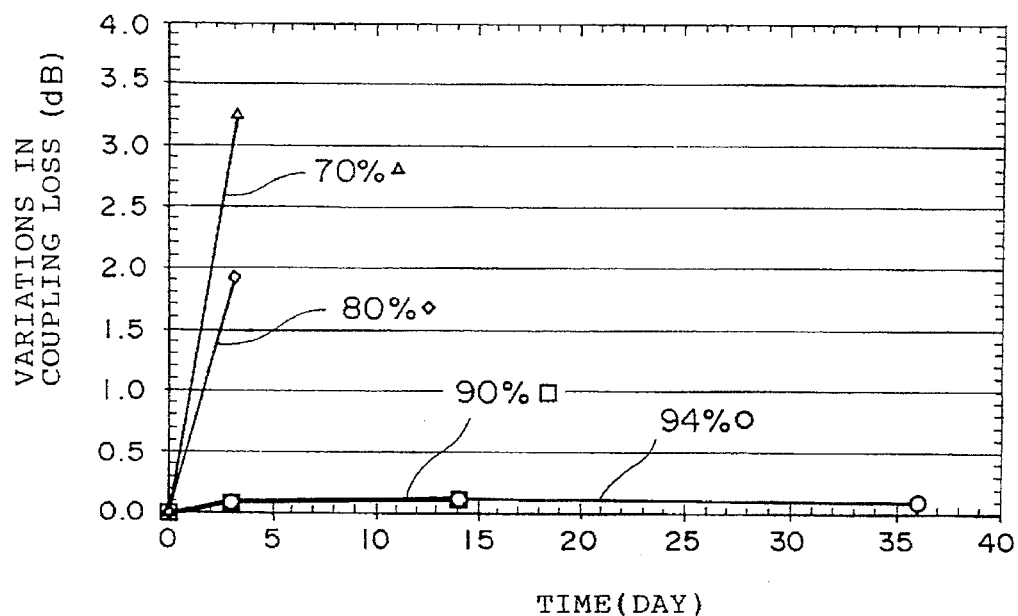
FIG. 28 is a graph showing a result obtained by measuring the moist heat characteristics of the optical waveguide module according to the present invention.
Figure 29:
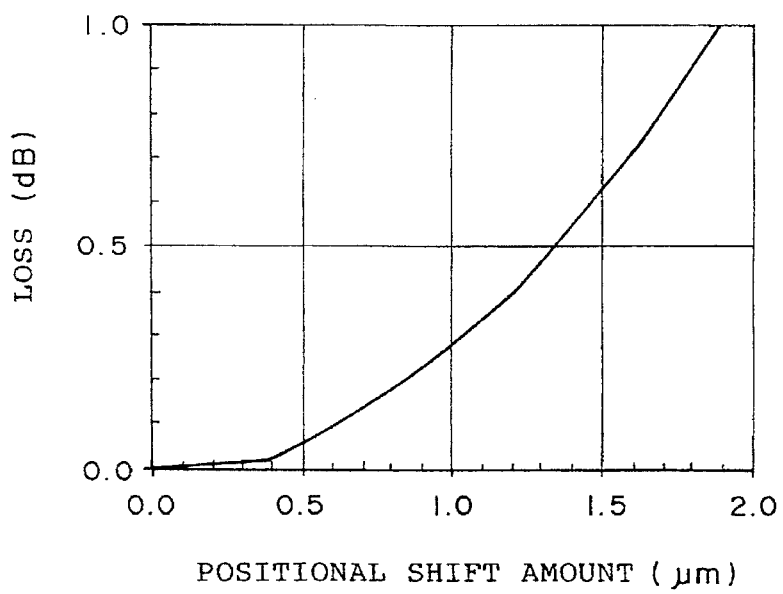
FIG. 29 is a graph showing a coupling loss caused by a positional shift between the optical fiber and an optical waveguide.

The moist heat characteristics of the optical waveguide module according to the present invention will be described. As has been mentioned previously, "Kogyo Zairyo" December issue, 1994 (Vol. 42, No. 15, pp. 112–116) shows that the theoretical limit value of the silica filler that can be contained in a plastic material suitable as the material to form the ferrule 3 is 96 volume %. FIG. 27 is a conceptual view schematically showing a packing model of spherical fillers. Secondary balls 600b, tertiary balls 600c, and fourth balls 600d are sequentially packed in gaps formed by largest-diameter primary balls 600a. Accordingly, the above theoretical value of 96 volume % indicates the limit value that allows a resin, e.g., a plastic, to be filled in the gaps of the fillers.

The present inventors prepared ferrules 3 made of a phenol-based epoxy resin respectively containing 70, 80, 90, and 94 weight % of a silica filler, and fixed each of them by adhesion on a 1×8 branched waveguide component 1 having a waveguide substrate 110, thereby fabricating optical waveguide modules as samples. The moist heat characteristics of these optical waveguide modules were measured in an environment having a temperature of 75° C. and a relative humidity (RH) of 95% (for example, the specification of the moist heat characteristics of TR-NWT-001209 manufactured by Bellcore is 60° C., 95RH, and 336 hours, and the specification of the moist heat characteristics of TA-NWT-001221 manufactured by Bellcore is 75° C., 90 ±5RH, and 5000 hours). The results shown in FIG. 28 were obtained for the respective optical waveguide modules. As can be seen from these results, a good result was obtained especially with a ferrule utilizing a material containing 90 to 95 weight % of a silica filler. It was confirmed that a sample having a large transmission loss had peeling at its adhering portion 13.

As has been described above, according to the present invention, a low-cost plastic material, which can be molded continuously and which has a thermal expansion coefficient and modulus of elasticity having a predetermined relationship with those of a material forming a waveguide substrate, is used as a material to form a ferrule, in place of a material, e.g., glass, which is difficult to machine. Therefore, an optical waveguide module having sufficient characteristics, even in the presence of temperature variations, can be obtained.

When the content of the silica filler in the plastic material is adjusted, an optical waveguide module also having excellent moist heat characteristics can be obtained.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 169496/1994 (6-169496) filed on Jul. 21, 1994 is hereby incorporated by reference.

What is claimed is:

1. An optical waveguide module comprising:

a waveguide component having a waveguide substrate made of a first material and at least one optical waveguide for propagating light having a predetermined wavelength, said at least one optical waveguide provided on said waveguide substrate;

a ferrule serving as a holder for holding one end of at least one optical fiber so as to optically couple said one end of said at least one optical fiber and one end of said at least one optical waveguide of said waveguide component, said ferrule being made of a second material and having at least one through hole having a continuous inner wall that defines a position where an end portion of said at least one optical fiber is to be placed, and said ferrule being fixed with an adhesive having a predetermined strength such that an end face thereof opposes an end face of said waveguide component while holding said one end of said at least one optical fiber, said first material being a different material than said second material, and said second material satisfying a relation $|\Delta L/(E_1/E_2)| < 3.0 \times 10^{-6}$ (°C.$^{-1}$) with respect to said first material forming said waveguide substrate, where $\Delta L$ is a difference in thermal expansion coefficient between said first material and said second material, $E_1$ is a modulus of elasticity of said first material, and $E_2$ is a modulus of elasticity of said second material.

2. A module according to claim 1, wherein said first material is a material selected from the group consisting of silicon and silica glass.

3. A module according to claim 1, wherein said second material is a plastic material.

4. A module according to claim 3, wherein said plastic material is a phenol-based epoxy resin containing a predetermined amount of silica filler and having a thermal expansion coefficient of not more than $10 \times 10^{-6}$ (°C.$^{-1}$).

5. A module according to claim 4, wherein said silica filler is contained in an amount of not less than 90 weight % and not more than 95 weight %.

6. A module according to claim 4, wherein said silica filler is contained in an amount of not less than 85 weight % and not more than 95 weight %.

7. A module according to claim 3, wherein said plastic material is a phenol-based epoxy resin containing a predetermined amount of silica filler and having a thermal expansion coefficient of not more than $6 \times 10^{-6}$ (°C.$^{-1}$).

8. A module according to claim 3, wherein said plastic material is a phenol-based epoxy resin containing a predetermined amount of silica filler and having a modulus of elasticity of not more than 5,000 (kg/mm$^2$).

9. A module according to claim 1, wherein said adhesive used for fixing said end face of said optical waveguide and said end face of said ferrule with each other by adhesion is an ultraviolet-curing or thermoset adhesive having an adhesion strength of not less than 50 (kg/cm$^2$) with respect to silica glass.

10. A ferrule which can be utilized in an optical waveguide module used for optically coupling at least one optical fiber and an optical functional component that realizes a predetermined function, said ferrule being made of a plastic material and having at least one through hole having a continuous inner wall that defines a position where an end portion of said at least one optical fiber is to be placed, and said ferrule serving as a holding member of said at least one optical fiber, wherein said plastic material is a phenol-based epoxy resin containing a predetermined amount of silica filler and having a thermal expansion coefficient of not more than $10 \times 10^{-6}$ (°C.$^{-1}$), and wherein said silica filler is contained in an amount of not less than 85 weight % and not more than 95 weight %.

11. A ferrule according to claim 10, wherein said optical functional component is made of a material different than said plastic material of said ferrule, and wherein said plastic material satisfies the relation $|\Delta L/(E_1/E_2)|<3.0 \times 10^{-6}$ (°C.$^{-1}$) with respect to said material of said optical functional component, where $\Delta L$ is a difference in thermal expansion coefficient between said material of said optical functional component and said plastic material, $E_1$ is a modulus of elasticity of said material of said optical functional component, and $E_2$ is a modulus of elasticity of said plastic material.

12. A ferrule according to claim 11, wherein said plastic material is a phenol-based epoxy resin containing a predetermined amount of silica filler and having a thermal expansion coefficient of not more than $6 \times 10^{-6}$ (°C.$^{-1}$).

13. A ferrule according to claim 11, wherein said silica filler is contained in an amount of not less than 90 weight % and not more than 95 weight %.

14. A ferrule according to claim 11, wherein said plastic material is a phenol-based epoxy resin containing a predetermined amount of silica filler and having a modulus of elasticity of not more than 5,000 kg/mm$^2$.

15. A ferrule according to claim 10, wherein said plastic material is a phenol-based epoxy resin containing a predetermined amount of silica filler and having a thermal expansion coefficient of not more than $6 \times 10^{-6}$ (°C.$^{-1}$).

16. A ferrule according to claim 10, wherein said silica filler is contained in an amount of not less than 90 weight % and not more than 95 weight %.

17. A ferrule according to claim 10, wherein said plastic material is a phenol-based epoxy resin containing a predetermined amount of silica filler and having a modulus of elasticity of not more than 5,000 (kg/mm$^2$).

18. An optical communications system comprising:
at least one optical fiber for propagating light having a predetermined wavelength; and
an optical waveguide module to which said at least one optical fiber is optically connected, said optical waveguide module comprising:
a waveguide component having a waveguide substrate made of a first material and at least one optical waveguide for propagating light having a predetermined wavelength, said at least one optical waveguide provided on said waveguide substrate;
a ferrule serving as a holder for holding one end of said at least one optical fiber so as to optically couple said one end of said at least one optical fiber and one end of said at least one optical waveguide of said waveguide component, said ferrule being made of a second material and having at least one through hole having a continuous inner wall that defines a position where an end portion of said at least one optical fiber is to be placed, and said ferrule being fixed with an adhesive having a predetermined strength such that an end face thereof opposes an end face of said waveguide component while holding said one end of said at least one optical fiber,
said first material being a different material than said second material, and said second material satisfying a relation $|\Delta L/(E_1/E_2)|<3.0 \times 10^{-6}$ (°C.$^{-1}$) with respect to said first material forming said waveguide substrate, where $\Delta L$ is a difference in thermal expansion coefficient between said first material and said second material, $E_1$ is a modulus of elasticity of said first material, and $E_2$ is a modulus of elasticity of said second material.

19. A method of manufacturing an optical waveguide module, said method comprising:
adhering, with an adhesive having a predetermined strength, an end face of a waveguide component and an end face of a ferrule, said waveguide component having a waveguide substrate made of a first material and at least one optical waveguide for propagating light having a predetermined wavelength, said at least one optical waveguide being provided on said waveguide substrate, and said ferrule being made of a second material and having an end portion of at least one optical fiber being inserted in and fixed by adhesion to at least one through hole of said ferrule, said through hole having a continuous inner wall, said adhering being preformed while said end faces of said waveguide component and said ferrule are abutted against each other;
aligning an end face of said at least one optical waveguide and an end face of a core of said at least one optical fiber held by said ferrule with each other; and
subsequently solidifying said adhesive,
said first material being a different material than said second material, and said second material forming said ferrule satisfying a relation $|\Delta L/(E_1/E_2)|<3.0 \times 10^{-6}$ (°C.$^{-1}$ m) with respect to said first material forming said waveguide substrate, where $\Delta L$ is a difference in thermal expansion coefficient between said first material and said second material, $E_1$ is a modulus of elasticity of said first material, and $E_2$ is a modulus of elasticity of said second material.

20. A method according to claim 19, wherein said second material is a plastic material.

21. A method according to claim 20, wherein said plastic material is a phenol-based epoxy resin containing a predetermined amount of silica filler and having a thermal expansion coefficient of not more than $10 \times 10^{-6}$ (°C.).

22. A method according to claim 21, wherein said silica filler is contained in an amount of not less than 85 weight % and not more than 95 weight %.

23. A method according to claim 21, wherein said silica filler is contained in an amount of not less than 90 weight % and not more than 95 weight %.

24. A method according to claim 20, wherein said plastic material is a phenol-based epoxy resin containing a predetermined amount of silica filler and having a thermal expansion coefficient of not more than $6 \times 10^{-6}$ (°C.$^{-1}$).

25. A method according to claim 20, wherein said plastic material is a phenol-based epoxy resin containing a predetermined amount of silica filler and having a modulus of elasticity of not more than 5,000 (kg/mm$^2$).

26. A method according to claim 19, wherein said first material is a material selected from the group consisting of silicon and silica glass.

27. A method according to claim 19, wherein said adhesive is an ultraviolet-curing or thermoset adhesive having an adhesion strength of not less than 50 (kg/cm$^2$) with respect to silica glass.

* * * * *